(12) United States Patent
Chakraborty et al.

(10) Patent No.: US 12,373,270 B2
(45) Date of Patent: **\*Jul. 29, 2025**

(54) AUTO-HYPOTHESES ITERATION TO CONVERGE INTO SITUATION-SPECIFIC SCIENTIFIC CAUSATION USING INTUITION TECHNOLOGY FRAMEWORK

(71) Applicant: SENSLYTICS CORPORATION, Peachtree Corners, GA (US)

(72) Inventors: Rabindra Chakraborty, Johns Creek, GA (US); Jay Kalra, San Jose, CA (US); Anupam Awasthi, Saratoga, CA (US); Amol Awasthi, Dubai (AE)

(73) Assignee: SENSLYTICS CORPORATION, Peachtree Corners, GA (US)

( \* ) Notice: Subject to any disclaimer, the term of this patent is extended or adjusted under 35 U.S.C. 154(b) by 198 days.

This patent is subject to a terminal disclaimer.

(21) Appl. No.: 17/578,185

(22) Filed: Jan. 18, 2022

(65) Prior Publication Data

US 2022/0138031 A1 May 5, 2022

Related U.S. Application Data

(63) Continuation-in-part of application No. 16/161,944, filed on Oct. 16, 2018, now Pat. No. 11,226,856,
(Continued)

(51) Int. Cl.
| | |
|---|---|
| *G06F 11/00* | (2006.01) |
| *H04L 67/02* | (2022.01) |
| *H04L 67/12* | (2022.01) |

(52) U.S. Cl.
CPC .............. *G06F 11/00* (2013.01); *H04L 67/02* (2013.01); *H04L 67/12* (2013.01)

(58) Field of Classification Search
CPC ....... H04L 67/52; H04L 67/306; H04L 67/01; H04L 67/025; H04L 67/34; H04L 67/10;
(Continued)

(56) References Cited

U.S. PATENT DOCUMENTS 6,484,108 B1 \* 11/2002 Burgmayer ........... F22B 37/421
702/29
8,620,725 B2 \* 12/2013 Neuweg ................. G06Q 40/03
705/7.38
(Continued)

*Primary Examiner* — Ninos Donabed
(74) *Attorney, Agent, or Firm* — Womble Bond Dickinson (US) LLP

(57) ABSTRACT

Methods and systems correlating hypotheses outcomes using relevance scoring for intuition based forewarning are disclosed. For one example, an intuition based forewarning method includes collecting and storing core data and surroundings data, wherein the core data includes parameters describing a system and ring data includes parameters describing surroundings of the system. The collected core data and ring data are analyzed to determine one or more changing situations of the system. A relevance score is provided for each determined changing situation of the system based on the analyzed core data and ring data. Each determined situation is correlated with one or more hypotheses outcomes representing a future system state based on the relevance score. The hypotheses may be modified using, for example, auto-hypothesis generation. A system forewarning is generated based on the correlated hypotheses outcomes which can be observed by one or more users.

11 Claims, 22 Drawing Sheets

HYPOTHESIS AND RELEVANCE SCORING TABLE
1210

| Timestamp 1211 | Core/Ring Data 1212 | Isolated Patterns 1213 | Hypotheses Evaluated 1214 | Relevance Score Calculated 1215 |
|---|---|---|---|---|
| $t_1$ | $C_{itj}, R_{itj}$ | $\Delta C_{itj}, \Delta R_{itj}$ | $H_{1tj}, H_{2tj}, H_{3tj} \cdots H_{dtj}$ | $S_{1tj}, S_{2tj}, S_{3tj} \cdots S_{dtj}$ |
| $t_0$ | $R_{jto}$ | $\Delta R_{jto'}$ | $H_{1to}, H_{2to}, H_{3to} \cdots H_{dto}$ | $S_{1to}, S_{2to}, S_{3to} \cdots S_{dto}$ |
| $t_k$ | $C_{jtk}, \dot{C}_{jtk}$ | $\ddot{C}_{itk}, \Delta R_{itk}$ | $H_{1tk}, H_{2tk}, H_{3tk} \cdots H_{dtk}$ | $S_{1tk}, S_{2tk}, S_{3tk} \cdots S_{dtk}$ |
| $t_n$ | $C_{ptn}, C_{jtn}$ | $\dot{C}_{ptn}, \Delta C_{jtn}$ | $H_{1tn}, H_{2tn}, H_{3tn} \cdots H_{dtn}$ | $S_{1tn}, S_{2tn}, S_{3tn} \cdots S_{dtn}$ |
| ... | ... | ... | ... | ... |
| $t_x$ | $R_{stx}$ | $\dot{R}_{stx}, \ddot{R}s_{stx}$ | $H_{1tx}, H_{2tx}, H_{3tx} \cdots H_{dtx}$ | $S_{1tx}, S_{2tx}, S_{3tx} \cdots S_{dtx}$ |

Related U.S. Application Data which is a continuation of application No. 16/125,263, filed on Sep. 7, 2018, now Pat. No. 10,445,162, which is a continuation of application No. 14/735,975, filed on Jun. 10, 2015, now Pat. No. 10,073,724.

(60) Provisional application No. 62/152,742, filed on Apr. 24, 2015.

(58) Field of Classification Search
CPC ....... H04L 67/02; H04L 67/12; H04L 69/329; H04W 4/70
See application file for complete search history.

(56) References Cited

U.S. PATENT DOCUMENTS

| | | | | |
|---|---|---|---|---|
| 9,449,287 | B2* | 9/2016 | Gunjan | G06N 20/00 |
| 10,489,711 | B1* | 11/2019 | Inbar | H04L 41/142 |
| 2006/0100912 | A1* | 5/2006 | Kumar | G06F 16/951 |
| | | | | 705/4 |
| 2008/0016412 | A1* | 1/2008 | White | H04L 43/08 |
| | | | | 714/48 |
| 2010/0015579 | A1* | 1/2010 | Schlabach | G06N 5/04 |
| | | | | 434/11 |
| 2010/0205541 | A1* | 8/2010 | Rapaport | G06Q 10/10 |
| | | | | 715/753 |
| 2012/0233531 | A1* | 9/2012 | Ma | G11B 27/322 |
| | | | | 715/205 |
| 2013/0030875 | A1* | 1/2013 | Lee | G06Q 30/0601 |
| | | | | 705/14.58 |
| 2013/0066568 | A1* | 3/2013 | Alonso | F17D 5/06 |
| | | | | 702/51 |
| 2013/0173168 | A1* | 7/2013 | Abitrabi | E21B 43/32 |
| | | | | 702/6 |
| 2014/0337047 | A1* | 11/2014 | Mears | G16H 50/70 |
| | | | | 705/2 |
| 2015/0055608 | A1* | 2/2015 | Egner | H04W 4/025 |
| | | | | 370/329 |
| 2015/0310344 | A1* | 10/2015 | Gunjan | G06Q 50/01 |
| | | | | 706/52 |
| 2015/0339373 | A1* | 11/2015 | Carlson | H04L 51/04 |
| | | | | 707/737 |
| 2016/0119260 | A1* | 4/2016 | Ghafourifar | H04L 51/066 |
| | | | | 709/206 |
| 2017/0017576 | A1* | 1/2017 | Cammarota | G06F 12/0893 |

* cited by examiner

TIME SERIES CORE VARIABLES AND EXTRAPOLATED OUTPUTS TABLE
1200

| Timestamp 1201 | Core Variables: System State 1202 | Core Data Projected after T 1203 |
|---|---|---|
| $t_1$ | $c_{1t1}, c_{2t1}, c_{3t1} \ldots c_{pt1}$ | $P_{1tm+1}, P_{2tm+T}, P_{3tm+T} \ldots$ |
| $t_2$ | $c_{1t2}, c_{2t2}, c_{3t2} \ldots c_{pt2}$ | |
| ⋮ | ⋮ | |
| $t_m$ | $c_{1tm}, c_{2tm}, c_{3tm} \ldots c_{ptm}$ | |

*FIG. 12A*

COREDATA, RINGDATA AND ISOLATED PATTERNS TABLE
1205

| Timestamp 1206 | Core Variables: System State 1207 | Ring Variables: Surroundings 1208 | Sparse Patterns Matrix 1209 |
|---|---|---|---|
| $t_1$ | $C_{1t1}, C_{2t1}, C_{3t1} \cdots C_{pt1}$ | $R_{1t1}, R_{2t1}, R_{3t1} \cdots R_{qt1}$ | $\dot{C}_{ptrv} \ddot{C}_{itk} \dot{R}_{stx}, \ddot{R}_{xtf}$ |
| $t_2$ | $C_{1t2}, C_{2t2}, C_{3t2} \cdots C_{pt2}$ | $R_{1t2}, R_{2t2}, R_{3t2} \cdots R_{qt2}$ | |
| ... | ... | ... | |
| $t_m$ | $C_{1tm}, C_{2tm}, C_{3tm} \cdots C_{ptm}$ | $R_{1tm}, R_{2tm}, R_{3tm} \cdots R_{qtm}$ | |

*FIG. 12B*

HYPOTHESIS AND RELEVANCE SCORING TABLE
1210

| Timestamp 1211 | Core/Ring Data 1212 | Isolated Patterns 1213 | Hypotheses Evaluated 1214 | Relevance Score Calculated 1215 |
|---|---|---|---|---|
| $t_1$ | $C_{itj}, R_{itj}$ | $\Delta C_{itj}, \Delta R_{itj}$ | $H_{1tj}, H_{2tj}, H_{3tj} \cdots H_{dtj}$ | $S_{1tj}, S_{2tj}, S_{3tj} \cdots S_{dtj}$ |
| $t_o$ | $R_{jto}$ | $\Delta R_{jto}$ | $H_{1to}, H_{2to}, H_{3to} \cdots H_{dto}$ | $S_{1to}, S_{2to}, S_{3to} \cdots S_{dto}$ |
| $t_k$ | $C_{jtk}, C_{jtk}$ | $\ddot{C}_{itk}, \Delta R_{itk}$ | $H_{1tk}, H_{2tk}, H_{3tk} \cdots H_{dtk}$ | $S_{1tk}, S_{2tk}, S_{3tk} \cdots S_{dtk}$ |
| $t_n$ | $C_{ptn}, C_{jtn}$ | $\dot{C}_{ptn}, \Delta C_{jtn}$ | $H_{1tn}, H_{2tn}, H_{3tn} \cdots H_{dtn}$ | $S_{1tn}, S_{2tn}, S_{3tn} \cdots S_{dtn}$ |
| $\vdots$ | $\vdots$ | $\vdots$ | $\vdots$ | $\vdots$ |
| $t_x$ | $R_{stx}$ | $\dot{R}_{stx}, \ddot{R}s_{stx}$ | $H_{1tx}, H_{2tx}, H_{3tx} \cdots H_{dtx}$ | $S_{1tx}, S_{2tx}, S_{3tx} \cdots S_{dtx}$ |

FIG.12C

NUMERICAL EXAMPLE TABLE
1400

| TIME SERIES 1401 | CORE DATA ISOLATED PATTERNS 1402 | RING DATA ISOLATED PATTERNS 1403 |
|---|---|---|
| TS1 | T=-50, FCOL range change > 10%<br>T=-765 METH_OD < 10% | T=-562, GOR > 0.25 |
| TS2 | T=-1022, FCOL acceleration > 10% | T=-1324, POFR rate increased > 5% |

*FIG. 14*

Historical Data Analysis 1500

Timestamps: Back window Scan length is same for all variables. Assume Timestamps are unit time apart (1 sec)

| Core Variables | T1 | T2 | T3 | T4 | T5 | T6 | T7 | T8 | T9 | T10 | T11 | Event T12 |
|---|---|---|---|---|---|---|---|---|---|---|---|---|
| C1 | 0.1 | 0.11 | 0.09 | 0.17 | 0.2 | 0.23 | 0.24 | 0.27 | 0.29 | 0.31 | 0.34 | 0.41 |
| C2 | 0.8 | 0.75 | 0.76 | 0.6 | 0.58 | 0.55 | 0.56 | 0.58 | 0.55 | 0.54 | 0.58 | 0.61 |

Ring Variables

| | T1 | T2 | T3 | T4 | T5 | T6 | T7 | T8 | T9 | T10 | T11 | T12 |
|---|---|---|---|---|---|---|---|---|---|---|---|---|
| R1 | 0.08 | 0.08 | 1.1 | 1.3 | 1.32 | 1.38 | 1.4 | 1.3 | 1.4 | 1.3 | 1.4 | 1.4 |

Patterns — Task: Forewarn when C1 > 0.4 and C2 > 0.7

| | T1 | T2 | T3 | T4 | T5 | T6 | T7 | T8 | T9 | T10 | T11 |
|---|---|---|---|---|---|---|---|---|---|---|---|
| C1 | 0.10 | -0.18 | 0.89 | 0.18 | 0.15 | 0.04 | 0.13 | 0.07 | 0.07 | 0.10 | 0.21 |
| C2 | -0.06 | 0.01 | -0.21 | -0.03 | -0.05 | 0.02 | 0.04 | -0.05 | -0.02 | 0.07 | 0.05 |
| R1 | 0.00 | 12.75 | 0.18 | 0.02 | 0.05 | 0.01 | -0.07 | 0.08 | -0.07 | 0.08 | 0.00 |
| C1 | 0.01 | -0.02 | 0.08 | 0.03 | 0.03 | 0.01 | 0.03 | 0.02 | 0.02 | 0.03 | 0.07 |
| C2 | -0.05 | 0.01 | -0.16 | -0.02 | -0.03 | 0.01 | 0.02 | -0.03 | -0.01 | 0.04 | 0.03 |
| R1 | 0.00 | 1.02 | 0.20 | 0.02 | 0.06 | 0.02 | -0.10 | 0.10 | -0.10 | 0.10 | 0.00 |
| C1 | -0.03 | 0.10 | -0.05 | 0.00 | -0.02 | 0.02 | -0.01 | 0.00 | 0.01 | 0.04 | -0.07 |
| C2 | 0.06 | -0.17 | 0.14 | -0.01 | 0.04 | 0.01 | -0.05 | 0.02 | 0.05 | -0.01 | -0.03 |
| R1 | 1.02 | -0.82 | -0.18 | 0.04 | -0.04 | -0.12 | 0.20 | -0.20 | 0.20 | -0.10 | 0.00 |

*FIG. 15A*

ISOLATED PATTERNS 1510

| | T1 | T2 | T3 | T4 | T5 | T6 | T7 | T8 | T9 | T10 | T11 | T12 |
|---|---|---|---|---|---|---|---|---|---|---|---|---|
| Value C1 | | | 0.08 | | | | | | | | | |
| Value C2 | | | -0.16 | | | | | | | | | |
| Value R1 | | 1.02 | | | | | | | | | | |
| Rate Change C1 | | | 0.89 | | | | | | | | | |
| Rate Change C2 | | | -0.21 | | | | | | | | | |
| Rage Change R1 | | 12.75 | | | | | | | | | | |
| Acceleration C1 | | 0.10 | | | | | | | | | | |
| Acceleration C2 | | -0.17 | | | | | | | | | | |
| Acceleration R1 | | -0.82 | | | | | | | | | | |

This is only one Run (Time Series 1). There will be many runs like this Time Series2, TS3 ... TSN etc. Each one builds trend/pattern templates.

*FIG.15B*

HYPOTHESES TABLE 1520

Hypotheses

| | | | | |
|---|---|---|---|---|
| H1 | Percent Rate of Change of C1 | > | 0.5 | and consistent rate of growth > 0.1 gradient |
| H2 | Acceleration of C2 | > | 0.1 | |
| H3 | and deceleration rate of R1 | > | -0.75 | |

H1-H3 triggers a forewarning condition. When live data are fed, the lead time is generated using corresponding trendtemplate.

Stored in Database 920 associated Time Stamped record containing data from Pattern, Trend, Hypotheses and Core/Ring data

| T3 | C1 | C2 | R1 | H1 | H2 | H3 | W1 | W2 | B1 | B2 | A1 | A2 |
|---|---|---|---|---|---|---|---|---|---|---|---|---|
| Isolated Stamp | Core/Ring Data | | | All Hypotheses | | | | | All Trend Details | | | |

FIG.15C

AUTO-HYPOTHESES ITERATION TO CONVERGE INTO SITUATION-SPECIFIC SCIENTIFIC CAUSATION USING INTUITION TECHNOLOGY FRAMEWORK

PRIORITY

This application is a continuation-in-part of and claims the benefit of U.S. patent application Ser. No. 16/161,944, entitled "METHODS AND SYSTEMS CORRELATING HYPOTHESES OUTCOMES USING RELEVANCE SCORING FOR INTUITION BASED FOREWARNING," filed on Oct. 16, 2018, which is a continuation-in-part of and claims benefit of U.S. patent application Ser. No. 16/125,263, entitled "METHOD OF INTUITION GENERATION," filed on Sep. 7, 2018, which is a continuation of U.S. patent application Ser. No. 14/735,975, entitled "METHOD OF INTUITION GENERATION," filed on Jun. 10, 2015, issued as U.S. Pat. No. 10,073,724, which claims the benefit under 35 USC 119(e) of U.S. Provisional Patent Application No. 62/152,742 filed Apr. 24, 2015, all of which are incorporated by reference in their entirety and commonly assigned.

FIELD

Embodiments of the present invention relate to the field of predictive, preventive, forewarning analytics, event tracking and processing of combinations of data. In particular, embodiments of the present invention relate to the aggregation of large collections of sensor and contextual-based environmental data, performing processing on the aggregation and generating an improved analytic insight and ensuring regulatory compliance. More particularly, embodiments of the present invention relate to methods and systems correlating hypotheses outcomes using relevance scoring for intuition based forewarning.

BACKGROUND

Today, we are more connected as a society than ever before. Data is continuously being mined and stored from various sources by a plethora of companies and individuals. Data may be, among others, data from any type of sensor, data tracked by companies or data relevant to the public at large. Examples of data affecting the public at large may be traffic data, weather data, stock price data, etc.

Companies often use sensors to track the condition or movement of their equipment, the state of processes and inventory conditions. This may be referred to as a data ecosystem of a company. For example, sensors are used at oil wells to monitor various statistics of machines used in the oil drilling process. Additionally, sensors are used to monitor the storage and transportation of inventory. For example, sensors may be placed at intervals along an oil pipeline to monitor the physical condition of the pipeline and enable detection of issues such as leaks in the pipeline, physical damage to the pipeline and/or other similar emergencies. Sensors may be used to track the amount of oil at any point in the pipeline, the water density in the pipeline, the rate of flow of oil at any point in the pipeline, etc. In addition, sensors may be used to track the temperature of the interior of the pipeline, the exterior of the pipeline or the humidity surrounding the pipeline.

In addition, companies track their inventory and sales at their distribution centers. For example, an oil distribution company will track the amount of oil it sells to each gas station, airport, shipping yard, etc. The company may track the price at which each barrel of oil was sold, the date of the sale, etc. The company may also track its supply chain and distribution processes such that the time and steps taken to refine the oil are known. Furthermore, the location of each transport vessel (e.g., ship or truck) will be tracked throughout the distribution process (e.g., via global positioning system).

Currently, some forms of gathered data have been used to predict future events. For example, weather data, e.g., data relevant to the public at large, is routinely collected and used to predict future weather systems in a given geographic area. For example, data may be collected from thermometers, barometers, windsocks, humidity sensors, air pressure sensors, etc.

Currently, in order to determine the reliability of a piece of equipment, failure testing is done in a lab where identical samples of the piece of equipment are tested for extended hours under possible failure conditions to determine the Mean Time to Failure (MTTF). The statistical measure of the MTTF gives a general idea of the durability of a typical piece of equipment under predefined failure conditions. A second technique is known as Mean Time Between Failure (MTBF). MTBF provides mean time measurements between possible failures. Typically original equipment manufacturers (OEMs) determine the MTTF and MTBF for their equipment.

However, even though all of this data may be collected and stored by various sources, the use of such data in predictive or preventive analytics has thus far been limited. For example, the data used to predict the weather forecast (e.g., data relevant to the public at large) has not been combined with data collected by companies regarding their oil inventory and shipments (e.g., business application data such as the enterprise resource planning (ERP) of the company) along with a leak found in an upstream oil transporting pipeline, wherein the business faces a constraint in fulfilling a demand without violating compliance regulations.

Furthermore, predictive analytics have been limited in forewarning upcoming events in order to avoid undesired events from happening during the operation of a system. That is, situational changes to a system can occur rapidly in which a system state outcome may not be observed immediately or be readily deterministic. An analogy is if a person starts dieting today impact on weight or body mass index (BMI) may not be noticeable immediately and may take some time to be noticeable in determining the state of health of the person. Likewise, although there may be situational changes in a system that occurs rapidly, the situational changes may not have an immediate effect on a system outcome right away, but may have an effect later in time. In such a case, if those situational changes lead to an outcome in which forewarning is desired, a system should determine what if any relevance or affect each situational change may have on the system state outcome. Thus, a system should provide proper forewarning of potential outcomes as a result of situational changes in which losses or emergencies can be curbed or avoided.

SUMMARY

Methods and systems are disclosed to correlate hypotheses outcomes using relevance scoring for intuition based forewarning. The following methods and systems provides hypotheses management techniques that can bridge human or domain experience in determining situational changes with machine learning in determining a future state outcome of a system that may appear uncorrelated due to time gap between the changes in situation or surroundings and observed impact on the system. The disclosed hypotheses management techniques can use relevance scoring as a way to measure an impact of a situational change on each hypotheses outcome that describes a future system state outcome. Hypotheses outcomes can have expressions that can be updated, modified or iterated by a user, domain expert or by software as new situational changes occur for a system or as result of changing types of system core data and ring data. Machine learning analysis can be applied to the historical core data and ring data in determining hypotheses and refining hypotheses.

For one embodiment, an intuition based forewarning method comprising: collecting and storing core data and surroundings data, wherein the core data includes parameters describing a system and ring data includes parameters describing surroundings of the system; analyzing the collected core data and ring data, including some in the form of time series data, to determine one or more changing situations of the system and providing a relevance score for hypothesis outcomes based on each determined changing situation of the system based on the analyzed core data and ring data, wherein the relevance score indicates a correlation between said each determined changing situation of the system and each of the hypothesis outcomes, the relevance score of at least one determined changing situation of the system correlated with an observed impact on the system that may appear uncorrelated due to a time gap between each other as a result of ingesting and processing core and ring data as time series data and using human interpretation, and wherein analyzing the collected core data and ring data comprises creating conditions for the hypothesis outcomes by: ingesting core data and ring data as a time series; identifying one or more trends or one or more patterns that led to abnormal system behavior by analyzing ingested core data and ring data; and identifying thresholds for each parameter or variable that is indicative of abnormal system behavior, the thresholds being part of the conditions; correlating each determined situation with one or more hypotheses outcomes representing a future system state based on the relevance score; modifying one or more of the hypothesis outcomes to reduce a gap between hypothesis outcomes and actual observations when hypotheses outcome do not agree with the actual observations; and generating a system forewarning based on the correlated hypotheses outcomes using associated relevance scores.

Other methods, systems, and computer readable-mediums are described.

BRIEF DESCRIPTION OF THE DRAWINGS

The appended drawings illustrate examples and embodiments and are, therefore, exemplary and not considered to be limiting in scope.

FIG. 12A is an exemplary time Series Core Variables and Extrapolated Outputs Table 1200.

FIG. 12B is an exemplary Core Data, Ring Data and Isolated Patterns Table 1205.

FIG. 12C is an exemplary Hypotheses and Relevance Scoring Table 1210.

FIG. 14 is an exemplary Numerical Example Table 1400.

FIG. 15A Historical Data Analysis Table 1500.

FIG. 15B Isolated Patterns Table 1510.

FIG. 15C Hypotheses Table 1520.

DETAILED DESCRIPTION

Figure 1:
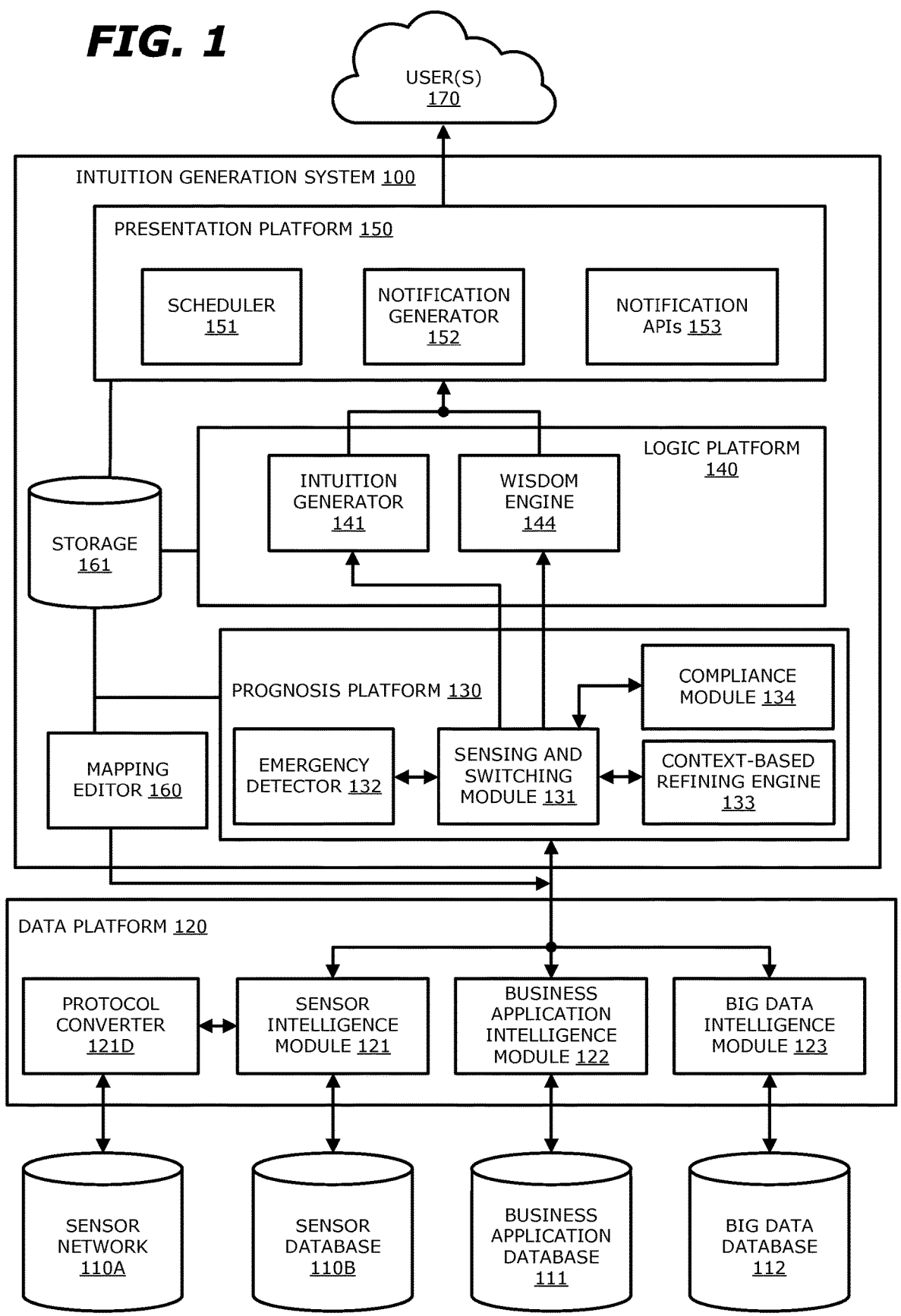
FIG. 1 is a block diagram of an exemplary intuition generation system (IGS) 100 communicatively coupled to a data platform 120 and data sources 110-112.

Methods and apparatuses are disclosed herein for implementing an improved insight and intuition generation process through the use of aggregating multiple data sources for use with predictive analytics and preventive models. One goal of embodiments of the present invention is, using an aggregation of collected data, obtaining improved, reliable and accurate insights, forecasts and recommendations for taking current action regarding, among others, commercial decisions. Using the insights and/or intuition outputs of the intuition generator system (IGS) 100, a course of action pertaining to a business or personal decision may be recommended. The discussion herein uses the oil and gas industry as a primary example. However, the ideas and inventive aspects portrayed in the examples may be applied to other industries (e.g., nuclear energy plants, recycling plants, etc.), commercial ventures or personal motives.

Certain embodiments disclosed herein discuss a device or set of devices, or a system comprising a device or set of devices and a plurality of databases for implementing the invention. Yet other embodiments discuss a series of steps for implementing the invention wherein the steps may include gathering data from a plurality of sensors and/or databases, converting the data into one or more interoperable formats, aggregating one or more portions of the data, applying one or more predefined rules and/or rule sets to the data and selecting a course of action to be presented to a user based on the result of the application of the one or more predefined rules and/or rule sets. The solution can be extended to incorporate fuzzy logic and other kinds of artificial intelligence.

Additionally, certain embodiments provide a solution to problems arising with the Internet of Things (IOT) wherein a plurality of sensors and databases contain a mass amount of data that is not analysed currently in the aggregate so that a course of action may be selected according to the application of one or more rules and/or rule sets to the aggregated data. Specifically, in current technology, certain data, e.g., weather and/or seismic data, may not be aggregated with data obtained through sensors on an oil pipeline. Additionally, the data obtained from the plurality of sensors and databases are retrieved in diverse formats using multiple APIs such that, currently, data from the various sensors and databases is not easily aggregated and interoperable. Therefore, embodiments of the disclosure discuss improving the functioning of an electronic device, e.g., a server or other dedicated hardware device, to include the capabilities for aggregating the gathered data from the plurality of sensors and/or databases by performing the necessary communications protocol and near real time format conversions. Additionally, embodiments of the disclosure discuss improvements to current technology relating to the IOT such that data obtained from a plurality of sensors and/or databases may be made interoperable to be analysed in the aggregate such that a course of action may be provided to a user that includes a solution to a problem, or imminently occurring problem, while taking into consideration all possible factors.

Furthermore, embodiments of the disclosure discuss steps in a series of generating a recommendation of one or more predefined courses of action by tying a processor's ability to extract or obtain data from a plurality of sources (sensors and/or databases), often located remotely from the electronic device housing the processor(s), with the processor's ability to analyze data in light of one or more predefined rules and/or rule sets enabling the processor(s) to present a selected course or courses of action to a user in accordance with the results of the analysis.

In contrast to MTTF and MTBF, Lead Time to Failure (LTTF) is a completely different concept in predictive analytics. A particular piece of equipment that is deployed interacts with the specific environment in which it operates. The environment in which the particular piece of equipment operates plays a major role in the degradation of the piece of equipment. Embodiments of the disclosure discuss determining LTTF from a current state of one or more particular pieces of equipment under the exact environment and conditions in which the one or more pieces of equipment are operating. In one example, an electric submersible pump (ESP) within an oil rig may degrade at a different rate while operating in the North Sea than while operating in Saudi Arabia. The LTTF may be interpreted as a real time monitoring based prediction technique that provides information the MTTF and MTBF cannot deliver.

Further examples and embodiments correlating hypotheses outcomes using relevance scores for intuition based forewarning are described. Core data and ring data are collected and stored. Core data includes parameters describing a system and ring data includes parameters describing surroundings of the system. The collected core data and ring data are analyzed to determine one or more changing situations of the system. A relevance score is provided for each changing situation of the system based on the analyzed core data and ring data. Each changing situation is correlated with one or more hypotheses outcomes representing a future system state based on the relevance score. A system forewarning is generated based on the correlated hypotheses outcomes and provided to one or more users. For one embodiment, hypotheses can be updated, revised or refined by a user or domain expert, and refinement of hypotheses can iterate to eventually determine a situational rule for situational changes in a system, which can used for providing a system forewarning.

For the following intuition based forewarning techniques, applications and modules can be developed using any type of programming language and technology such as Java, C++, Python, etc. Such applications and modules can be on any type of server, computer, computing device or data processing system having any type of development environment and tools.

Terminology

Some portions of the detailed descriptions that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

The term "big data" should be interpreted as data that affects the general public and should be not interpreted as relating to solely an amount of data. For example, weather data should be interpreted as big data as weather data affects the general public. Examples of weather data include, but are not limited or restricted to, temperature data (e.g., current and projected), rainfall data, humidity data, ultraviolet (UV) index data, wind data, etc.

The term "core data" can refer to parameters or information describing a system. Examples of such parameters or information can include, but are not limited or restricted to, time sampled data or continuously measured values such as temperature, pressure, viscosity, speed, etc. related to the system.

The term "ring data" can refer to parameters or information describing surroundings of a system such as, e.g., weather data, environmental data or big data.

The term "relevance score" can refer to a ratio of quantified measure of changes in a hypotheses outcome to one or more situational changes to a system using core data and ring data. A hypotheses outcome describes a potential a future system state. In the context of intuition based forewarning, relevance can be defined as the rate impact of the quantified representation of a situational change compounded from intelligence originated from core data and ring data to the hypotheses outcomes which attempts to describe the future system state.

A machine-readable medium includes any mechanism for storing or transmitting information in a form readable by a machine (e.g., a computer). For example, a machine-readable medium includes read only memory ("ROM"); random access memory ("RAM"); magnetic disk storage media; optical storage media; flash memory devices; etc.

The term "rule set" may be defined as one or more of the application of a software equation, the application of a binary logic, the performance of one or more curve fitting techniques and/or the application of one or more thresholds.

Lastly, the terms "or" and "and/or" as used herein are to be interpreted as an inclusive or meaning any one or any combination. Therefore, "A, B or C" or "A, B and/or C" mean "any of the following: A; B; C; A and B; A and C; B and C; A, B and C." An exception to this definition will occur only when a combination of elements, functions, steps or acts are in some way inherently mutually exclusive.

As this invention is susceptible to embodiments of many different forms, it is intended that the present disclosure is to be considered as an example of the principles of the invention and not intended to limit the invention to the specific examples and embodiments shown and described.

Intuition Generation System

Techniques for insight, cognition output and intuition generation are described. It is to be understood that the following example(s) is (are) for the purpose of explanation and not limitation. The proposed techniques will be explained in more detail further below with reference to drawings and diagrams.

Referring to FIG. 1, a block diagram of an exemplary intuition generation system (IGS) 100 communicatively coupled to a data platform 120 and data sources 110A/B-112 is shown. As illustrated in FIG. 1, the IGS 100 includes a prognosis platform 130, a logic platform 140, a presentation platform 150 and a mapping editor 160. The prognosis platform 130 includes an emergency detector 132, a sensing and switching module 131 and a context-based refining engine 133; the logic platform 140 includes an intuition generator 141 and a wisdom engine 142; and the presentation platform 150 includes a scheduler 151, a notification generator 152 and notification application program interfaces (APIs) 153. The notification generator 152 may, for example, generate alerts for the one or more users 170 in the form of a user interface (UI), an electronic mail message (email), a text message, or the like. In the embodiment illustrated in FIG. 1, the IGS 100 is communicatively coupled to a data platform 120. However, in a second embodiment, the data platform 120 may be included within the IGS 100. Herein, the data platform 120 includes a sensor intelligence module 121, a business application module 111, a big data intelligence module 123 and a protocol converter 121D. However, in a second embodiment, as illustrated in FIG. 2, the protocol converter 121D may be located within the sensor intelligence module 121.

Finally, the data platform 120 is communicatively coupled to a plurality of databases. In particular, the sensor intelligence module 121 is communicatively coupled to one or more sensors and/or a database storing data obtained from one or more sensors (the sensor network 110A and the sensor database 110B, respectively), the business application intelligence module 122 is communicatively coupled to a business application database 111 and the big data intelligence module 123 is communicatively coupled to a big data database 112.

In one embodiment, (i) the sensor network 110A may include data obtained directly from one or more sensors and the sensor database 110B may include data obtained from databases storing data received from one or more sensors such as Oracle 12c, Mongo DB, Cassandra, or a historian database such as Pi and/or PhD, (ii) the business application database 111 may include data obtained from a rational database management system (RDBMS) such as an Oracle applications database, and (iii) the big data database 112 may include data obtained from publicly or privately available sources such as stock prices, traffic conditions, global positioning system (GPS) locations, weather information, etc. For example, data may be obtained from the U.S. Geological Survey website, which publishes data in real-time using, in one embodiment, a format for encoding geographic data called GeoJSON.

Figure 2:
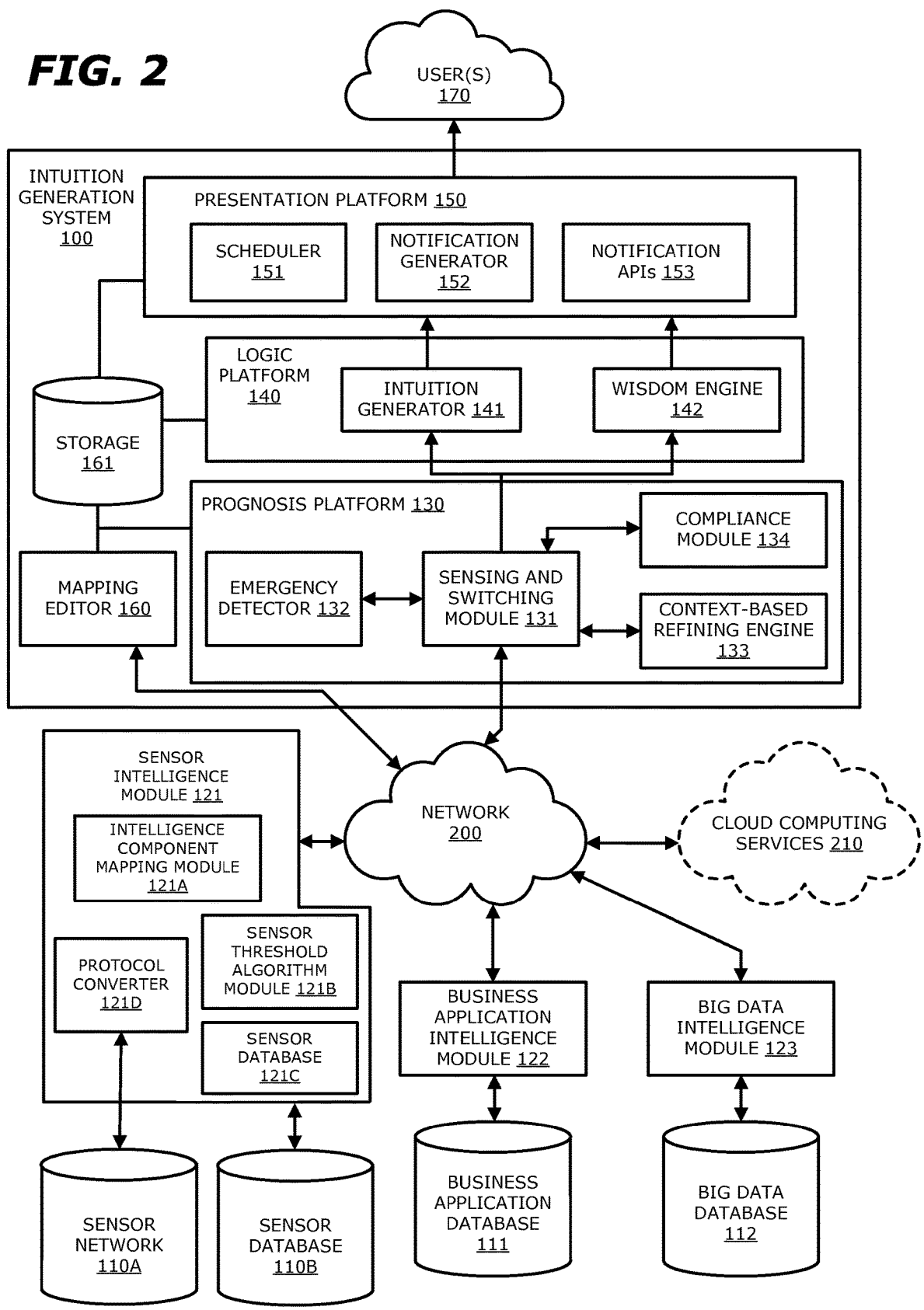
FIG. 2 is a block diagram of an exemplary intuition generation system (IGS) 100 communicatively coupled to the data platform 120 and the data sources 110-112 via a network 200.

Referring to FIG. 2, a block diagram of an exemplary intuition generation system (IGS) 100 coupled to a network 200 is shown. The network 200 provides communication connectivity between the IGS 100 and one or more intelligence modules and through the intelligence modules, various databases communicatively connected to the intelligence modules. In FIG. 2, the one or more intelligence modules, for illustrative purposes, include the sensor intelligence module 121, the business application intelligence module 122 and the big data intelligence module 123. The sensors and/or databases communicatively connected to the sensor intelligence module 121, the business application intelligence module 122 and the big data intelligence module 123 include the sensor network 110A, the sensor database 110B, the business application database 111 and the big data database 112, respectively. In other embodiments, additional or alternative intelligence modules may be connected to the network 200 wherein the additional or alternative intelligence modules are communicatively connected to related databases. In addition, the IGS 100 may be communicatively coupled to the cloud computing services 210 which may provide additional or alternative storage and/or processing hardware.

The IGS 100, as illustrated in FIGS. 1 and 2, may be an electronic network device specially configured for the generation of insights and/or intuitions. Alternatively, the IGS 100 may be software, hardware or firmware acting in coordination with a general purpose electronic device. In yet another embodiment, the IGS 100 may be contained with an individual processor, an embedded microcontroller, a microchip, or the like. In addition, although illustrated as a complete system, the IGS 100 may be comprised of various components such that one or more of the prognosis platform 130, the logic platform 140, the presentation platform 150 and/or the mapping editor 160, or one or more components therein, are located, for example, within the same general purpose electronic device on separate microcontrollers or, alternatively, on the same microcontroller. In addition, although not shown, the IGS 100 may include the storage 161 in order to store, for example, configuration instructions, data provided by one or more of the intelligence modules 121-123, generated insights, generated intuitions, generated UIs, received data, predefined rule sets, etc.

As shown in FIG. 2, the IGS 100 is a system that is adapted to analyze information associated with a plurality of data observed by one or more sensors or stored in one or more databases (e.g., the sensor network 110A, the sensor database 110B, the business application database 111 and/or the big data database 112). In one embodiment, the IGS 100 receives the observed and stored data over the network 200. The network 200 may include a public network such as the Internet, a private network such as a wireless data telecommunication network, wide area network, a type of local area network (LAN), or a combination of networks. Alternatively, the IGS 100 may receive observed data stored in a peripheral storage device.

It has also been envisioned that observed data does not need to be stored in one or more of the sensor database 110B, the business application database 111 and/or the big data database 112 prior to being analyzed by an intelligence module. For example, currently, data collected by sensors monitoring an oil pipeline may be within a private network such as a process control network. In such a situation, the intelligence modules may not directly access the sensor data sitting within the process control network but read the sensor data from a historian database once the data has been transmitted outside of the process control network. However, with proper authentication and APIs, the sensor intelligence module 121 may directly access the sensor data within the process control network as soon as it is collected by the sensors, e.g., through the sensor network 110A.

The sensor network 110A is shown to have a direct connection with the protocol converter 121D. This direct connection may be wired or wireless. The protocol converter 121D obtains data from the sensor network 110A (e.g., one or more sensors pertaining to equipment relevant to the generation of an insight and/or an intuition—e.g., sensors measuring the flow rate of crude oil in an oil pipeline) and converts the data to a format that is readable by the sensor threshold algorithm module 121B and the intelligence component mapping module 121A. Data obtained directly from one or more sensors (e.g., via a push or a pull method) may include of a diverse set of formats. Therefore, the protocol converter 121D includes predefined logic that maps the format of data obtained directly from one or more sensors to a format readable by the sensor threshold algorithm module 121B and the intelligence component mapping module 121A. For example, the protocol converter 121D may convert all data obtained directly from one or more sensors to the format of the data stored in the sensor database 121C (e.g., retrievable by the sensor threshold algorithm module 121B and the intelligence component mapping module 121A using standard SQL instructions). Additionally, the protocol converter 121D may store the data obtained directly from one or more sensors in the sensor database 121C after conversion of the data's format.

The databases communicatively coupled to the intelligence modules store particularized data. For example, the sensor database 110B stores data observed by one or more sensors. For example, an oil pipeline may be comprised of several hundreds of miles of piping to transport crude oil. Within, or connected to, the piping, several sensors gather raw data relating to various particulars of the oil and/or the piping. Examples of such particulars include, but are not limited or restricted to, oil level, flow rate of oil, water density in the piping, and/or the temperature inside and/or surrounding the piping.

In one embodiment, the business application database 111 stores data collected by enterprise databases relating to commercial management and business strategy (the Enterprise Resource Planning, "ERP," of a corporation). For example, the data collected by enterprise databases of an oil drilling corporation may include, but are not limited or restricted to, the amount of crude oil obtained over predetermined intervals (e.g., days, weeks, etc.), the price at which each gallon of crude oil was sold, the number of transportation vessels currently transporting product to one or more distribution centers, the number of transportation vessels currently idle, the schedule of the amount of product to be delivered to each distribution center, etc. The big data database 112 stores big data affecting the general public. Examples of big data include, but are not limited or restricted to, weather data, airline data (e.g., delays, routes), traffic data, stock prices, etc. In addition, the data stored in the databases 170-172 may be derived from public and/or private data depending on acquired authorization.

Although not illustrated, other embodiments have been envisioned wherein the intelligence modules (the sensor intelligence module 121, the business application intelligence module 122 and the big data intelligence module 123) are located within the cloud computing services 210. In such an embodiment, each intelligence module obtains the appropriate data from one of the databases 170-172 via the network 200 using the appropriate APIs. Additionally, some embodiments have been envisioned in which one or more components of the IGS 100 are contained with the cloud computing services 210. In one such embodiment, the IGS 100 including the prognosis platform 130, the logic platform 140 and the presentation platform 150 are contained within the cloud computing services 210.

FIG. 2 also illustrates that the intelligence modules 121-123 may include specialized logic that interacts with the mapping editor 160 of the IGS 100. Herein, although only the sensor intelligence module 121 is shown to include specialized logic for clarity, the business application intelligence module 122 and the big data intelligence module 123 may also include specialized logic corresponding to the business application database 111 and the big data database 112, respectively. As shown, the sensor intelligence module 121 may include an intelligence component mapping module 121A, a sensor threshold algorithm module 121B and a sensor database 121C. The sensor threshold algorithm module 121B determines whether a significant change (e.g., a change meeting and/or exceeding a predetermined threshold) in the raw data received from the sensor network 110A and/or the sensor database 110B exists since the most recent transmission of data from the sensor intelligence module 121 to the IGS 100. The sensor database 121C within the sensor intelligence module 121 stores the most recent data that was transmitted to the IGS 100. The intelligence component mapping module 121A receives instructions from a mapping editor 160 of the IGS 100. The instructions inform the sensor intelligence module 121 which variables derived from the data derived from the sensor network 110A and/or the sensor database 110B are to be transmitted to the IGS 100 when a significant change exists. As mentioned above, FIG. 2 illustrates an embodiment in which the protocol converter 121D is located within the sensor intelligence module 121. For example, the sensor intelligence module 121 may be a separate hardware device located in a separate physical location from the IGS 100 wherein communication between the IGS 100 and the sensor intelligence module 121 may occur over the network 200.

The intelligence component mapping module 121A filters the raw data obtained from the sensor network 110A and/or the sensor database 110B when the sensor threshold algorithm 121B indicates that a significant change exists between the current data obtained from the sensor network 110A and/or the sensor database 110B and the most-recently transmitted sensor data. The intelligence component mapping module 121A will be configured, and possibly reconfigured, via the instructions of the mapping editor 160 so that only the required variables are transmitted when a significant change exists. In addition, the sensor threshold algorithm module 121B may be preconfigured or configured via instructions from the mapping editor 160 with a list of the required variables to be transmitted to the IGS 100.

Figure 3:
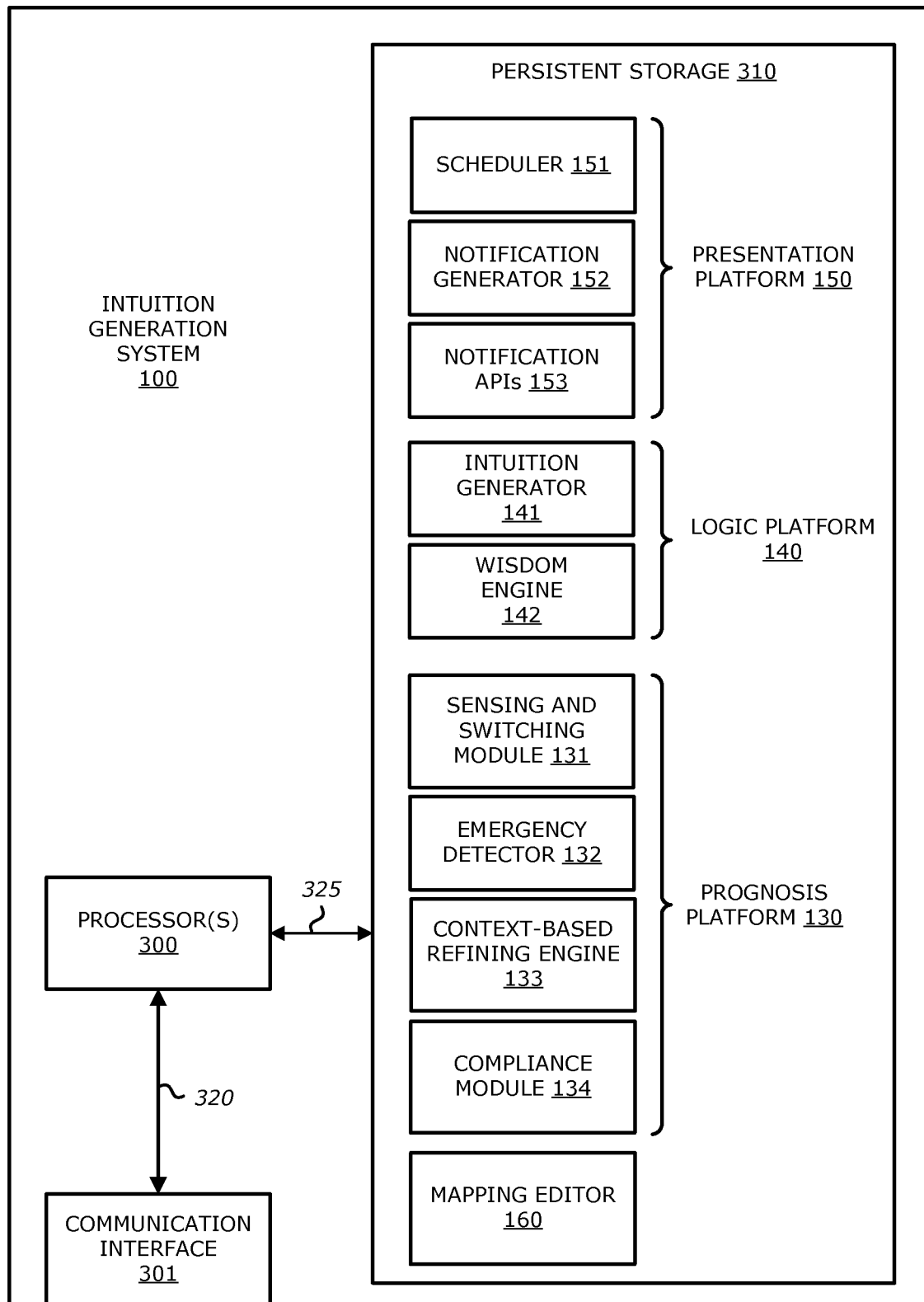
FIG. 3 is an exemplary embodiment of a logical representation of the IGS 100.

Referring to FIG. 3, an exemplary embodiment of a logical representation of the IGS 100 is shown. The IGS 100 includes one or more processors 300 that are coupled to communication interface logic 301 via a first transmission medium 320. Communication interface 301 enables communications with intelligence modules (e.g., the sensor intelligence module 121, the business application intelligence module 122 and/or the big data intelligence module 123) of FIGS. 1 and 2. According to one embodiment, communication interface 301 may be implemented as a physical interface including one or more ports for wired connectors. Additionally, or in the alternative, communication interface logic 301 may be implemented with one or more radio units for supporting wireless communications with other electronic devices.

The processor(s) 300 is further coupled to the persistent storage 310 via a transmission medium 325. According to one embodiment of the disclosure, the persistent storage 310 may include (a) the prognosis platform 130, including the sensing and switching module 131, the emergency detector 132, the context-based refining engine 133 and the compliance module 134; (b) the logic platform 140, including an intuition generator 141 and a wisdom engine 142; and (c) the presentation platform 150, including the scheduler 151, the notification generator 152 and the notification APIs 153. Of course, when implemented as hardware, one or more of these logic units could be implemented separately from each other.

Operation During Non-Emergency Situation

Figure 4:
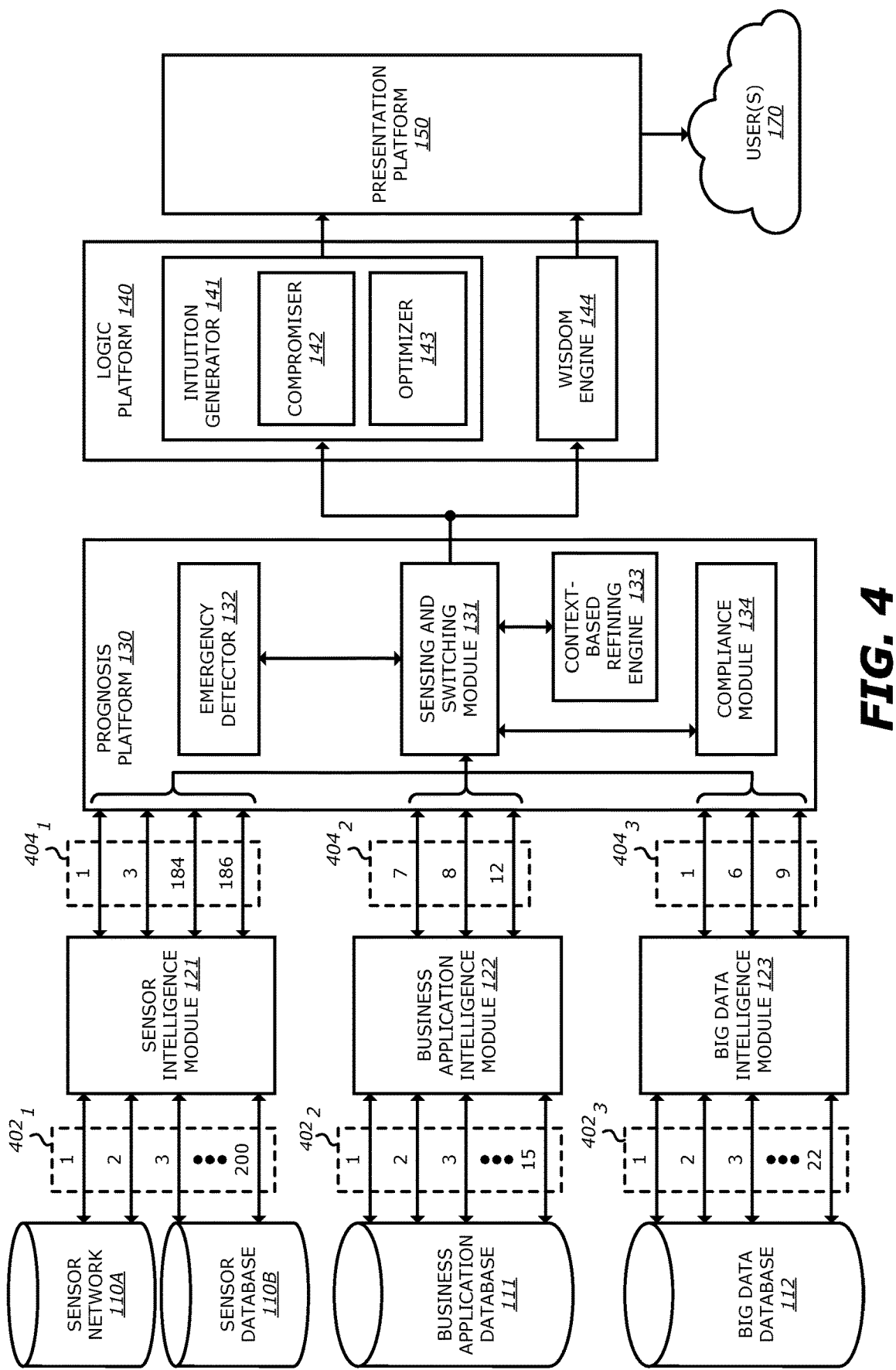
FIG. 4 is a data flow diagram of one embodiment of a data collection and insight and/or intuition generation process.

Referring to FIG. 4, a data flow diagram of one embodiment of a data collection and insight and/or intuition generation process is shown. As described in detail in accordance with FIGS. 1 and 2, the data $402_1$-$402_3$ is transmitted from the sensor network 110A and/or the sensor database 110B, the business application database 111 and the big data database 112 to the sensor intelligence module 121, the business application intelligence module 122 and the big data intelligence module 123, respectively. The illustration as seen in FIG. 4 uses the embodiment as seen in FIG. 2 wherein the protocol converter 121D is located within the sensor intelligence module 121.

The intelligence modules (the sensor intelligence module 121, the business applications intelligence module 122 and the big data intelligence module 123) communicate with the sensor network 110A and the databases 110B-112 via applicable APIs. As discussed above, data received from one or more sensors of the sensor network 110A is processed by the protocol converter 121D prior to being analyzed by the sensor threshold algorithm module 121B. Each intelligence module performs similar activities on the data received from the database to which each is connected.

The sensor intelligence module 121, the business application intelligence module 122 and/or the big data intelligence module 123 filter the received data $402_1$-$402_3$ based on instructions received from the mapping editor 160, as illustrated in FIGS. 1 and 2 (and implemented through an initial configuration and/or a reconfiguration process). One or more portions of the filtered data $404_1$-$404_3$ are subsequently transmitted to the sensing and switching module 131 when one or more of the intelligence modules 121-123 determine a significant change exists between the most recently transmitted data and the data derived from the sensor network 110A, the sensor database 110B, the business applications database 111 and/or the big data database 112.

When in a non-emergency situation (e.g., no notification from the emergency detector 132 has been received by the sensing and switching module 121), the sensing and switching module 131 transmits at least the sensor data to the wisdom engine 144. In some embodiments, along with the sensor data, the sensing and switching module 131 may provide the wisdom engine 144 with one or more variables obtained from the business application database 111 and/or the big data database 112. For example, a maintenance schedule of the oil pipeline may be obtained from the business application data 111 (e.g., via an ERP or MES) may be provided to the wisdom engine 144 according to configuration data. One or more predefined rule sets of the wisdom engine 144 may utilize a maintenance schedule in the generation of an insight.

In one embodiment, an insight may be interpreted as a recommendation for one or more actions to take, or not take, based on an analysis of at least the sensor data. A recommendation may be a predefined course of action that is selected based on the comparison of at least the sensor data to one or more predefined rule sets. In one embodiment, the result of a comparison of one or more portions of at least the sensor data to a rule set may determine the course of action. As discussed below, when one or more rule sets determine multiple courses of action, the courses of action may be ranked by priority (e.g., according to the course of action, the type of emergency, or rule set corresponding to the recommended course of action). Specifically, the insight should be understood as being a transformation of data collected from a plurality of sensors over a predetermined time frame to a concrete recommendation for a course of action based on an analysis of the collected data through the use of one or more rule sets.

Subsequently, the wisdom engine 144 may generate an insight according to the received data. For example, the wisdom engine 144 may receive data including, among other variables, the rate of flow of oil throughout an entire oil pipeline. The wisdom engine 144 may analyze the rate of flow at each sensor along the pipeline and determine an issue exists between two sensors due to a change in the rate of flow of oil exceeding a predetermined threshold. In one example, the rate of flow of oil may decrease from a first sensor to a second sensor more than a predetermined threshold (e.g., a percentage of the rate of flow at the first sensor) indicating that a leak is likely to exist between the first sensor and the second sensor. According to one or more predefined rule sets, the wisdom engine 144 may generate an insight as to a recommendation of an action that should be taken as a result of the leak. In one embodiment, the comparison of the leak (e.g., the percentage of change in the rate of flows) with a predefined rule set may result in the wisdom engine 144 generating an insight asserting that immediate attention needs to be given to the leak. For example, when the leak is above a first threshold, the insight may assert that a maintenance operator be informed of the leak and instructed to schedule maintenance to the pipe. In a second example, when the leak is above a second threshold higher than the first threshold, the insight may assert that a maintenance operator be informed of the leak, that the Board of Trustees of the corporation be informed of the leak, and the U.S. Fish and Wildlife Service be informed of the leak due to the severity and impact the leak may have on the surrounding environment and wildlife.

In one embodiment, in which the maintenance schedule is provided to the wisdom engine 144, the generated insight may recommend merely informing a maintenance operator of the leak but based on scheduled maintenance on the portion of the pipeline containing the leak and the mildness of the leak, immediate maintenance may not be required. Additionally, the wisdom engine 144 may be able to fit the received variables to a linear curve (e.g., using previously received data) and predict that the amount of oil lost due to the leak. This prediction would also be included in the generated insight. In addition to fitting one or more variables to a linear curve, the wisdom engine 144 may include a plurality of algorithms, functions and/or equations such as any linear or nonlinear functions, quadratic equations, trigonometric functions (e.g., sine and cosine), polynomial equations or the like for providing predictions according to predefined rule sets (e.g., the predefined rule sets incorporate one or more algorithms, functions, equations, etc. for utilizing the data received by the wisdom engine 144 to provide an insight to the one or more users 170). Hence, the wisdom engine 144 does not merely consider a single factor, variable, or fitting of data to a single curve. Instead, the wisdom engine 144 utilizes one or more rule sets (selected based on the received data) to analyze the received data in forming an insight.

The wisdom engine 144 may assign a weight to various variables and/or curve fittings. Such weightings may be initially configured as part of the overall configuration of the IGS 100 and the intelligence modules 121-123 (e.g., via the mapping editor), may be reconfigured over time or may evolve based on machine learning and heuristics. For example, the initial configuration of the IGS 100 may instruct the wisdom engine 144 to weigh the one or more variables within the received data more heavily than one or more other variables within the received data. However, over time, the wisdom engine 144, through machine-learning techniques, may alter the weighting of the various variables due to, among other factors, one or more variables routinely providing better fits to curves and/or more or less variation in the data (e.g., more or less outliers based on previously received data). This machine learning process may take place over days, weeks, months and/or years as data is collected. The insight is then provided to the presentation platform 150 which, through the notification generator 152, presents the insight to one or more users 160.

The compliance module 134 receives the data $404_1$ from the sensing and switching module 131 to determine whether the equipment including the one or more sensors supplying the data $402_1$ meet compliance requirements as set forth by various state, national and/or international acts and/or regulations. For example, the United States has enacted several acts that set forth requirements and restrictions relevant to the oil and gas industry. Examples of such acts include the Clean Water Act, the Resource Conservation and Recovery Act, the Oil Pollution Act, the Comprehensive Environmental Response, Compensation and Liability Act and the Federal Clean Air Act. Additionally, international acts and/or treaties may include relevant restrictions or requirements. Any of these acts or treaties may influence corporate policies.

The compliance module 134 may receive the data $404_1$ from the sensing and switching module 131 and apply one or more predefined rule sets to the data $404_1$. Specifically, the predefined rule sets correspond to one or more acts, treaties, laws and/or corporate policies that dictate whether a piece of equipment contributing to the generation of an intuition and/or an insight is in compliance with the acts, treaties, laws and/or corporate policies. For example, a leak in an oil pipeline may be detected and one or more sensors provide measurements enabling the derivation of the amount of crude oil being leaked over a set time interval. Furthering the example, one or more rules and/or rule sets (e.g., stored in the storage 161) may be predefined to correspond to the Clean Water Act such that when a predetermined amount of crude oil is being leaked over a set time interval, the oil pipeline may be found to be non-compliant with the Clean Water Act. Therefore, the compliance module 134, upon applying the one or more rules and/or rule sets corresponding to the Clean Water Act to the data $404_1$ and finding the oil pipeline to be non-compliant, may issue an alert to the one or more users 170 via the logic platform 140 (e.g., as part of an insight and/or an intuition). Furthermore, the one or more rules and/or rule sets may include one or more thresholds such that the one or more users 170 may be alerted to a piece of equipment nearing non-compliance. An alert of near compliance may enable the one or more users 170 to take actions to avoid non-compliance (and hence avoid penalties as a result of non-compliance). Additionally, the compliance module 134 may offer a "compliance as a service" feature such that a compliance alert is generated periodically and/or an API is predefined for extracting compliance data directly from the compliance module 134. For example, a corporation may be interested in receiving continued compliance information (e.g., for reporting or advertising purposes) which may be provided via a periodic compliance alert. In one embodiment, the use of a predefined API may allow a network administrator to extract compliance information directly from the compliance module 134 at preset intervals (via a push or pull method).

Furthermore, the compliance module 134 may determine "near" non-compliance as well. Near non-compliance may be defined as one or more variables of the data $404_1$ being compliant with the acts, regulations, laws, etc. used in determining compliance by the compliance module 134, but the one or more variables being within a predetermined threshold of non-compliance. For example, if a regulation limits the amount of oil that may be spilled per year and still remain compliant to the regulation, when 90 percent of the amount allowed has been spilled, near non-compliance may be detected.

Additionally, the sensing and switching module 131 transmits at least a subset of the business application data and the big data ("environmental data") to the emergency detector 132. When the emergency detector 132 determines no "emergency situation" presently occurring and no emergency situation is imminent, the IGS 100 provides the generated insight to the presentation platform 150 which in turn provides the insight to one or more users 170 via a generated UI.

Detection of and Operation During Emergency Situation

Still referring to FIG. 4, prior to the detection of an emergency, the sensing and switching module 131 may aggregate one or more portions of the business application data and the big data (herein after the aggregation may be referred to as "environmental data"). Subsequently, the sensing and switching module 131 may transmit at least a subset of the environmental data to the emergency detector 132. The emergency detector 132 analyzes the received environmental data to determine whether an "emergency situation" is presently occurring or is imminent based on the application of one or more predefined rule sets.

In one embodiment, a plurality of emergency situations may be predefined through one or more rule sets. For example, an emergency based on severe weather may be defined through a rule set stored in the emergency detector 132. The rule set may comprise a plurality of rules setting forth actions to take according to whether the value of particular variables meets or exceeds corresponding predetermined thresholds. In one example, an emergency may be detected when one or more thresholds are met and/or exceeded for one or more weather data variables (e.g., big data) such as snow accumulation within a predefined radius of an oil pipeline, temperatures within a predefined radius of the oil pipeline, the speed and direction of one or more jet streams, etc. In such an example, the emergency detector 132 compares the received environmental data, including the above-recited weather data variables, to predetermined thresholds corresponding to particular variables. According to a rule set for severe weather, when one or more thresholds are met or exceeded, the emergency detector 132 generates a notification identifying the severe weather emergency. In one embodiment, each variable may be weighted (e.g., assigned a score) and depending on whether the cumulative weight of the variables exceeding corresponding predefined thresholds is above a particular score, e.g. 70 out of 100, the emergency detector 132 may detect an emergency situation is presently occurring or is imminent.

The notification generated by the emergency detector 132 is provided to the sensing and switching module 131. In one example, a generated notification may include (a) the type of emergency detected, as determined by use of one or more predefined rule sets and (b) the one or more particular variables of the environmental data that met or exceeded a threshold triggering the detection of an emergency. The sensing and switching module 131 provides (i) the context-based refining engine 133 with the notification and (ii) the intuition generator 141 with the notification and one or more portions of the environmental data.

Based on the notification, the context-based refining engine 133 may obtain particularized data from one or more of the business application database 111 and/or the big data database 112 through one or more preconfigured queries. The one or more preconfigured queries used by the context-based refining engine 133 may be selected as a result of the type of emergency detected, and/or one or more variables set forth in the notification. In one embodiment, the context-based refining engine 133 may be configured such that a first emergency type indicated in a notification generated by the emergency detector 132 triggers the use of one or more preconfigured queries.

For example, when a severe weather emergency is detected and set forth in the notification, one or more predefined rules may be selected by the context-based refining engine 133. The one or more selected rule sets may set forth one or more preconfigured queries for querying the big data database 112 for weather data (e.g., current snow accumulation, predicted snow accumulation over a predefined time frame, current humidity levels, current wind speed, current temperature, etc.) within, for example, a 50 miles radius of a location on the oil pipeline the severe weather is expected to hit. According to the example, the notification would provide the point at which the severe weather is expected to hit (e.g., geographic coordinates). The one or more selected rule sets may define the radius for the which the weather data will be obtained and, in one embodiment, an increase in frequency at which to query the big data database. In other words, the one or more selected rule sets may set forth an increase in frequency for obtaining weather data near the location at which the severe weather is expected to hit in order to provide the intuition generator 141 with the most current data.

Upon obtaining the particularized environmental data, the context-based refining module 133 provides the particularized environmental data to the intuition generator 141 via the sensing and switching module 131. The intuition generator 141 generates an intuition based on at least one or more of the environmental data provided by the sensing and switching module 131, the notification generated by the emergency detector 132, and/or the particularized environmental data obtained by the context-based refining engine 133 as explained below.

Subsequently, the intuition generator 141 may generate an intuition based on an analysis of one or more of the received environmental data, the notification generated by the emergency detector 132 and/or the particularized data received from the context-based refining engine 133 ("received data"). For example, the received data may include, among other variables, the snow accumulation along an oil pipeline, the predicted snow accumulation along the pipeline for a predefined period in the future, the temperature along the pipeline and seismic data for geographic areas within a predetermined radius of the pipeline. The intuition generator 141 may analyze the snow accumulation along an oil pipeline, the predicted snow accumulation along the pipeline for a predefined period in the future, the temperature along the pipeline and received seismic data according to one or more predefined rule sets. Based on the notification generated by the emergency detector 132, a severe snowstorm may have been detected and details of such set forth in the notification. Herein, the severe snowstorm may have been detected as a result of one or more variables analyzed by the emergency detector 132 exceeding a predefined threshold corresponding to the variable (e.g., the snow accumulation at a particular geographic location on the pipeline exceeds a threshold).

The intuition generator 141 may use one or more predefined rule sets to analyze the received data. For example, according to one predefined rule set, the combination of the data set forth in received seismic data (e.g., indicating an earthquake having a magnitude above a predefined value occurred with a predefined radius of the pipeline) as well as the snow accumulation and predicted snow accumulation may result in the generation of an intuition asserting that a maintenance operator should be alerted to the current or anticipated snow accumulation and seismic information. In such an example, the intuition, as a result of the analysis based on the rule set, may further assert that there is a high likelihood that an earthquake of a similar magnitude as that detailed in the received data would rupture the pipeline and that the possible snow accumulation in that geographic area would make maintenance nearly impossible. Therefore, the intuition could further assert that crude oil flowing through the portion of the pipeline at the designated geographic location should be blocked and/or redirected. For example, the rule set may include a plurality of predefined thresholds to determine at what level of snow accumulation such an assertion should be made in the intuition.

Additionally, the intuition generator 141 may fit the variables of the received data to a linear curve (e.g., using previously received data) and predict that the amount of oil lost due to a rupture of the pipeline. This prediction would also be included in the generated intuition. In addition to fitting one or more variables to a linear curve, the intuition generator 141 may include a plurality of algorithms, functions and/or equations such as any linear or nonlinear functions, quadratic equations, trigonometric functions (e.g., sine and cosine), polynomial equations or the like for providing predictions according to predefined rule sets (e.g., the predefined rule sets incorporate one or more algorithms, functions, equations, etc. for utilizing the data received by the intuition generator 141 to provide an intuition to the one or more users 170). Hence, the intuition generator 141 does not merely consider a single factor, variable, or fitting of data to a single curve. Instead, the intuition generator 141 utilizes one or more rule sets (selected based on the received data) to analyze the received data in forming an intuition.

The intuition generator 141 may assign a weight to various variables and/or curve fittings. Such weightings may be initially configured as part of the overall configuration of the IGS 100 and the intelligence modules 121-123 (e.g., via the mapping editor), may be reconfigured over time or may evolve based on machine learning and heuristics. For example, the initial configuration of the IGS 100 may instruct the intuition generator 141 to weigh the one or more variables within the received data more heavily than one or more other variables within the received data. However, over time, the intuition generator 141, through machine-learning techniques, may alter the weighting of the various variables due to, among other factors, one or more variables routinely providing better fits to curves and/or more or less variation in the data (e.g., more or less outliers based on previously received data). This machine learning process may take place over days, weeks, months and/or years as data is collected.

As illustrated in FIG. 4, the intuition generator 141 may include a compromiser 142 and an optimizer 143. The compromiser 142 may include one or more predefined rule sets specific to determining a recommendation in an emergency situation that minimizes damage. For example, when an emergency included a severe snowstorm is imminent near a particular portion of an pipeline, the compromiser 142 may include one or more rule sets that pertain to handling severe snowstorm emergencies wherein the one or more rules sets are selected by the intuition generator 141 based on the emergency type. The optimizer 143 may include one or more rule sets for ranking the priority of various recommendation to be provided in an intuition.

Upon generation of an intuition, the intuition generator 141 provides the intuition to the presentation platform 150. Specifically, the notification generator 152 receives the generated insight and generates a user interface (UI) that is presented to one or more users 170. The generated UI may be provided to the one or more users 170 at predetermined time intervals stored in the scheduler 151. Additionally, the notification APIs 153 may be used by the notification generator 152 to provide the generated UI to a plurality interfaces. For example, the notification generator 152 may utilize the notification APIs 153 to generate UIs for an Apple® iPad, a Google® Nexus tablet, a Blackberry® Passport mobile device, wherein each device includes a different operating system requiring a unique API.

Example Flows of Operations of the Intuition Generation System

Figure 5:
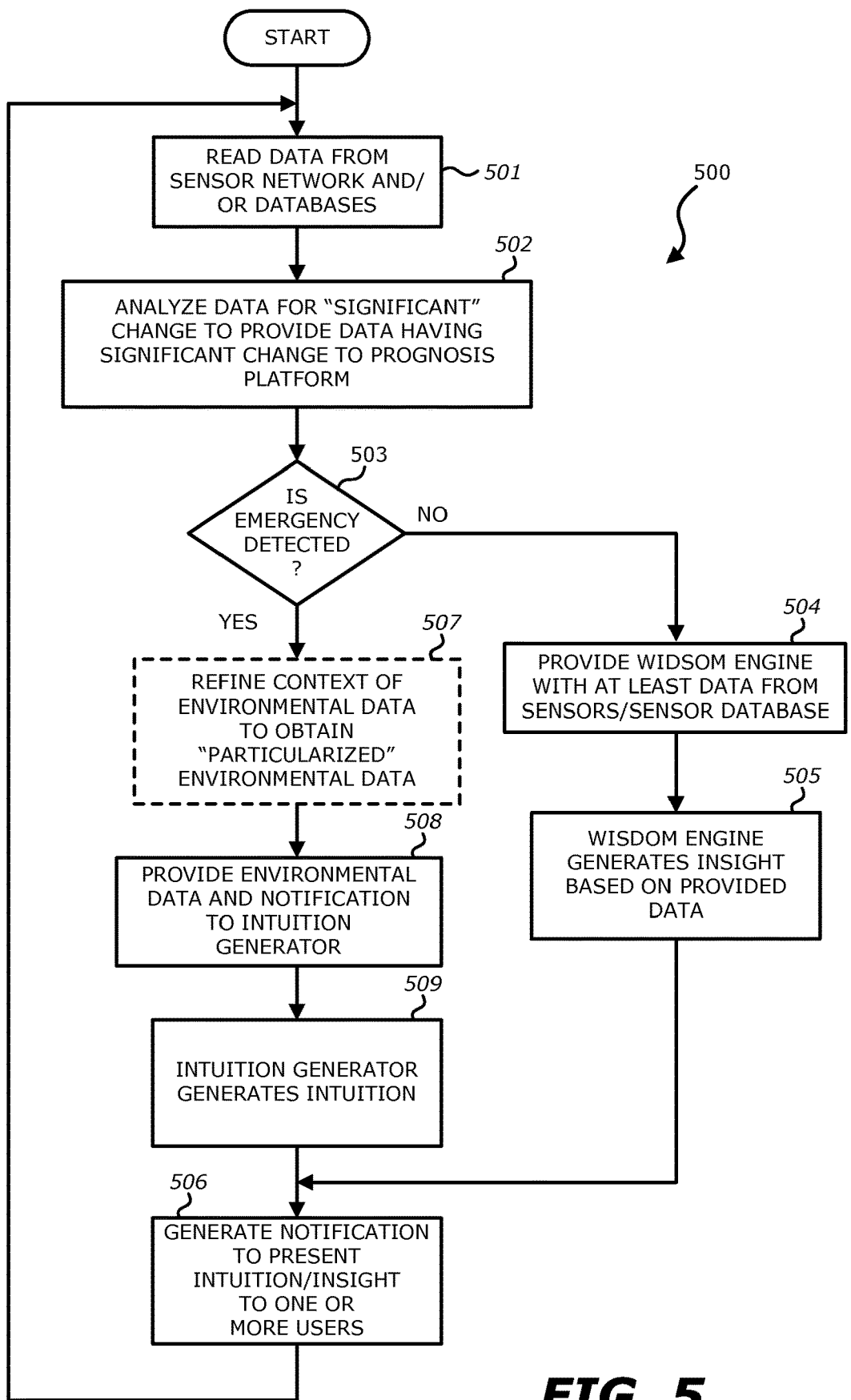
FIG. 5 is a flowchart of an exemplary data collection and insight and/or intuition generation process.

Referring to FIG. 5, a flowchart of an exemplary data collection and insight and/or intuition generation process is shown. Each block illustrated in FIG. 5 represents an operation performed in the method 500 of generating an insight and/or an intuition based on the use of IGS 100 of FIG. 1 is shown. At block 501, data is read from the one or more of the sensor network 110A, the sensor database 110B, the business application database 111 and/or the big data database 112. As illustrated in FIGS. 1 and 2, the data may by read, e.g., via one or more queries, from one or more of the databases using one or more of the corresponding intelligence modules, the sensor intelligence module 121, the business application module 122 and/or the big data intelligence module 123. In one embodiment, the one or more intelligence modules query the corresponding databases at predetermined time intervals (e.g., a pull method). Alternatively, each of the sensor network 110A, the sensor database 110B, the business application database 111 and/or the big data database 112 may transmit data (e.g., predetermined variables) at predetermined intervals (e.g., a push method).

At block 502, the sensor intelligence module 121, the business application module 122 and/or the big data intelligence module 123 analyze the data obtained from one or more of the sensors and/or databases at block 501. The analysis as block 502 determines whether a significant change in the obtained data, as discussed above, exists to warrant providing the data to the prognosis platform 130.

At block 503, the switching and sensing module 131 determines whether an emergency has been detected. As discussed above, the emergency detector 132 analyzes at least a subset of the environmental data (e.g., not sensor data) to determine whether an emergency situation is occurring or whether an emergency situation is imminent. The emergency detector 132 notifies the sensing and switching module 131 when an emergency is occurring or is imminent. The sensing and switching module 131 is configured to transmit, at least, the data obtained from the sensor network 110A and/or the sensor database 110B to the wisdom engine 144 when the emergency detector 132 has not notified the wisdom engine 144 that an emergency is occurring and/or is imminent (no at block 503).

When an emergency has not been detected (no at block 503), the sensing and switching module 131 provides the wisdom engine 144 with data from, at least, the sensor network 110A and/or the sensor database 110B (block 504). The sensing and switching module 131 may also provide data from the business application database 111 and/or the big data database 112 to the wisdom engine 144. For example, the wisdom engine 144 may receive data including sensor data as well as data obtained from one or more of the business application database 11 and/or the big data database 112. In one embodiment, the sensor database 110B may include data derived from a Laboratory Information Management System (LIMS) and/or a Manufacturing Execution System (MES). At block 505, the wisdom engine 144 analyzes the data provided by the sensing and switching module 131 in order to generate an insight.

Subsequently, at block 506, the generated insight is provided to the presentation platform 150. Specifically, the notification generator 152 receives the generated insight and may generate a UI that is presented to one or more users 170. The generated UI may be provided to the one or more users 170 at predetermined time intervals stored in the scheduler 151. Additionally, the notification APIs 153 may be used by the notification generator 152 to provide the generated UI to a plurality of interfaces, as discussed above. Upon presenting the UI to the one or more users 170, the method 500 returns to block 501 wherein data is read from one or more of the sensors and/or databases.

When an emergency has been detected (yes at block 503), the context-based refining engine 133 optionally refines the context of the environmental data that is provided to the intuition generator 141 (block 507, optionally represented by the dotted lines). The amount of data comprising the environmental data may be incredibly large and include a lot of environmental data not relevant to the emergency. For example, when an emergency with an oil pipeline is detected, e.g., a severe snowstorm or a potential earthquake, environmental data regarding most of the pipeline is not relevant to the generation of the intuition. Instead, the context-based refining engine 133 may obtain weather data for a specific stretch of the pipeline (e.g., a 30 mile radius of a center of the severe snowstorm) at an increased frequency (e.g., the context-based refining engine 133 may query the big data database 112, which includes weather data, at predefined time intervals) using specialized queries.

As discussed above, the context-based refining engine 132 may be comprised of one or more predetermined rule sets wherein, for example, the specialized queries are predefined, or the specialized queries may include variables that are replaced, by the context-based refining engine 133, with information included in the notification from the emergency detector 132.

At block 508, the environmental data (including the particularized environmental data obtained by the context-based refining engine 133) and the notification generated by the emergency detector 132 are provided to the intuition generator 141. At block 509, the intuition generator generates an intuition based on the environmental data and/or the notification generated by the emergency detector 132. At block 506, the generated intuition is provided to the presentation platform 150, wherein the notification generator 152 generates a UI that is presented to one or more users 170, as discussed above.

Figure 6:
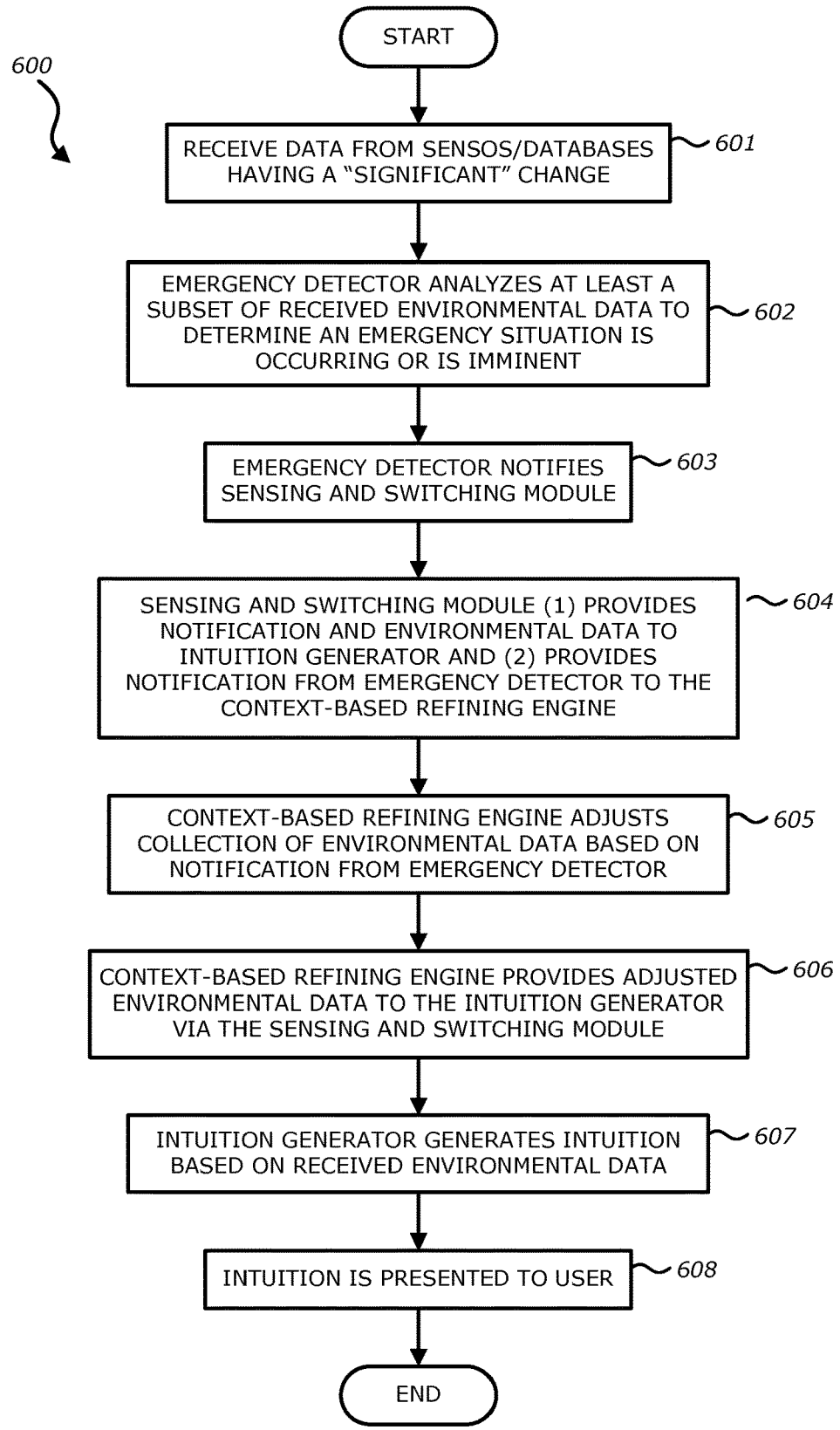
FIG. 6 is a second flowchart of an exemplary process for detecting an emergency and utilizing the intuition engine 141 of the IGS 100 to generate an intuition.

Referring to FIG. 6, a second flowchart of an exemplary process for detecting an emergency and utilizing the intuition engine 141 of the IGS 100 to generate an intuition is shown. Each block illustrated in FIG. 6 represents an operation performed in the method 600 of generating an insight and/or an intuition based on the use of IGS 100 of FIG. 1 is shown. At block 601, the sensing and switching module 131 of the prognosis platform 130 receives data from sensors and/or databases wherein the received data includes a significant change from the data previously transmitted by the sensors and/or databases.

As discussed above, the sensing and switching module 130 may aggregate one or more portions of the business application data and the big data received from the sensors and/or databases (referred to as "environmental data"). Subsequently, the sensing and switching module transmits the environmental data to an emergency detector 132 of the prognosis platform 130. At block 602, the emergency detector 132 analyzes at least a subset of the received environmental data to determine whether an emergency situation is occurring or is imminent. At block 603, upon determining that an emergency situation is occurring or is imminent (e.g., through the application of one or more rule sets to at least a subset of the environmental data), the emergency detector 132 generates a notification and transmits the notification to the sensing and switching module 130.

At block 604, the sensing and switching module (i) provides the notification and the environmental data to an intuition generator 141 of the logic platform 140 and (ii) provides the notification to the context-based refining engine 133. At block 605, the context-based refining engine obtains particularized environmental data based on the information in the notification. As discussed above, the context-based refining engine 133 may select one or more rule sets defining further actions to be taken by the context-based refining engine 133 according to the notification. For example, the type of emergency detected by the emergency detector 132 may result in the section of a predefined rule set that sets forth one or more preconfigured queries for the context-based refining engine 133. In one embodiment, the one or more preconfigured queries may be directed at focusing the collection of data from one or more of the sensor network 110A, the sensor database 110B, the business application database 111 and/or the big data database 112 according to the information in the notification. The particularized environmental data (and/or sensor data, if applicable), may be provided to the intuition generator 141 via the sensing and switching module 131.

At block 607, the intuition generator 141 generates an intuition based on one or more of the received environmental data, the received particularized environmental data and/or the notification ("received data"). As discussed above, the intuition generator 131 may apply one or more predefined rule sets to the received data to generate an intuition, which may be interpreted as a recommendation for one or more actions to take, or not take, based on an analysis of the received data. A recommendation may be a predefined course of action that is selected based on the comparison of the environmental data and/or the notification to one or more rule sets. In one embodiment, the result of a comparison of one or more portions of the environmental data to a rule set may determine the course of action. As discussed below, when one or more rule sets determine multiple courses of action, the courses of action may be ranked by priority (e.g., according to the course of action, the type of emergency, or rule set corresponding to the recommended course of action). Specifically, the intuition should be understood as being a transformation of data collected from a plurality of sensors and/or databases over a predetermined time frame to a concrete recommendation for a course of action based on an analysis and extrapolation of the collected and historical data through the use of one or more rule sets.

Finally, at block 608, the generated intuition is provided to a notification generator 152 of the presentation platform 150. The notification generator 152 generates a UI in order to present the generated intuition to one or more users 170. Additionally, the notification APIs 153 enable the notification generator 152 to generate UIs for a plurality of device types and the scheduler 151 allows the UI presenting the intuition to be provided to one or more users 170 at predetermined times.

In one embodiment, the predefined courses of action may be stored in the storage 161 and updated according to data received via the network 200. For example, as a pipeline is extended or a new method of transportation is added to an oil and gas company's ecosystem (e.g., all equipment, personnel and processes involved in the production of the company's product), a course of action may be added to the plurality of courses of action. Additionally, a course of action may be updated via data received over the network 200, or a course of action may be removed from the plurality of courses of action stored in the storage 161. Similarly, one or more rules may be updated in the same manner. The updated one or more rules may reflect an update to one or more courses of action or may alter, add to or remove from, existing rules.

Figure 7A:
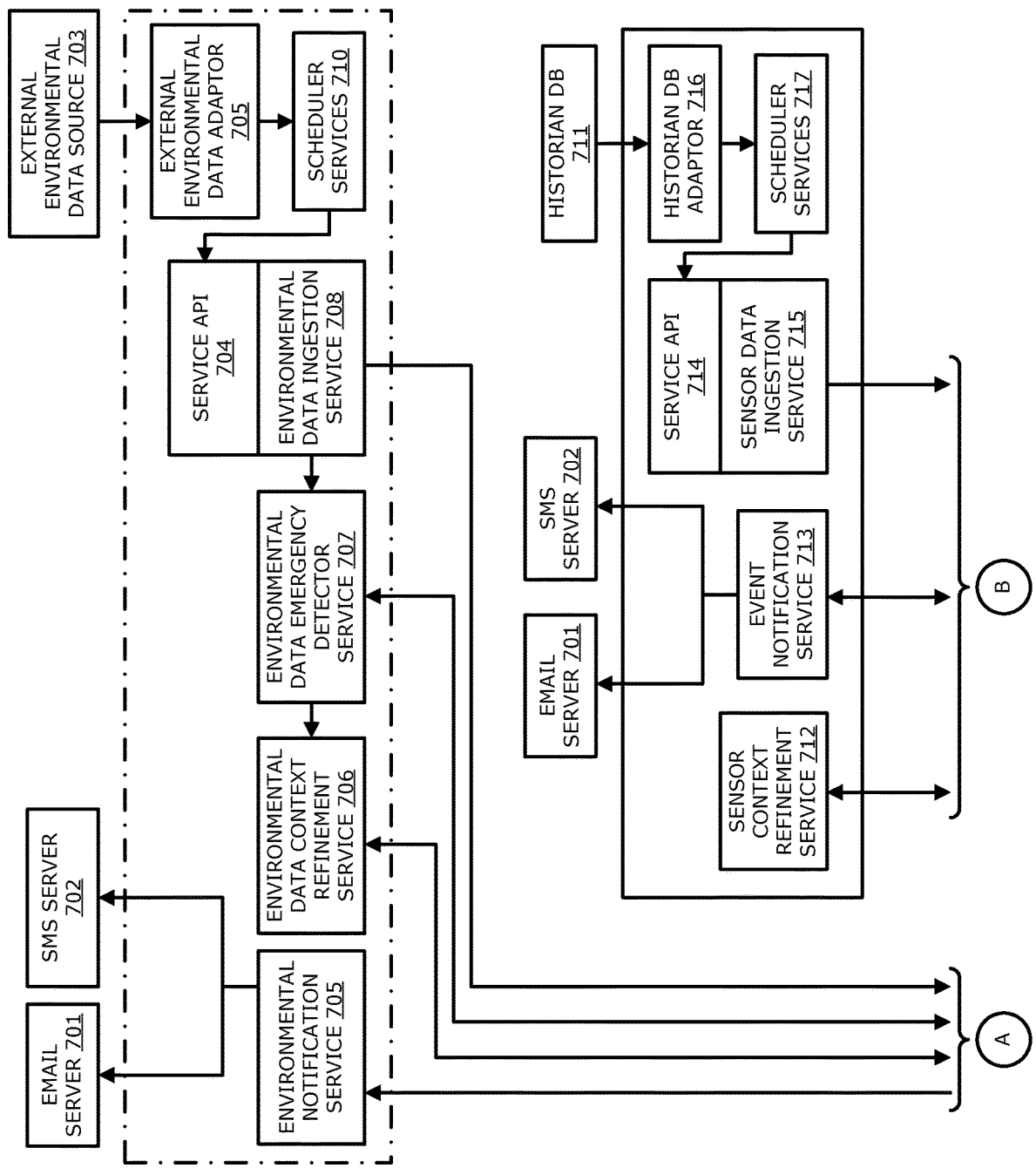
FIG. 7A is a first block diagram of a detailed sample architecture of the IGS 100.
Figure 7B:
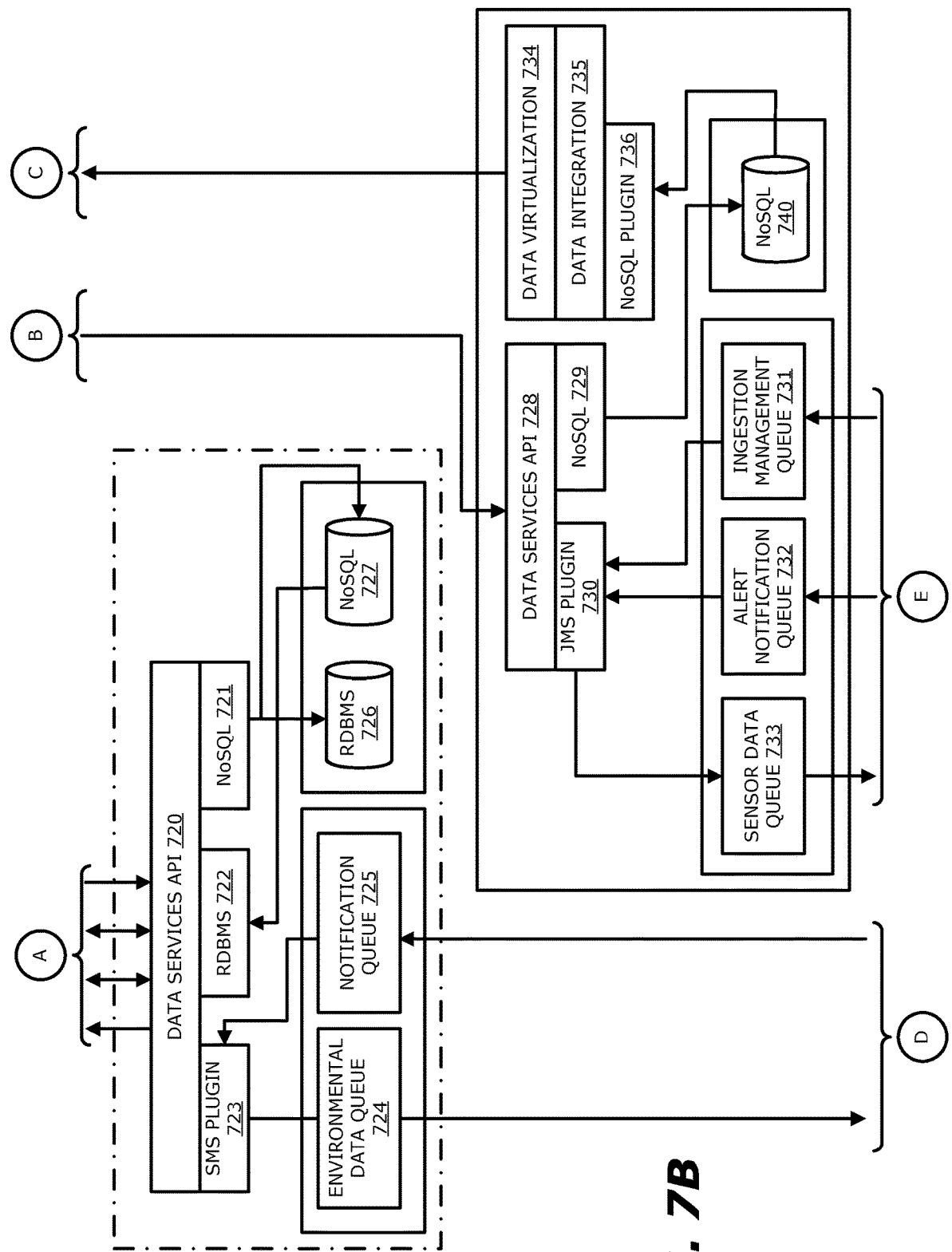
FIG. 7B is a second block diagram of a detailed sample architecture of the IGS 100.
Figure 7C:
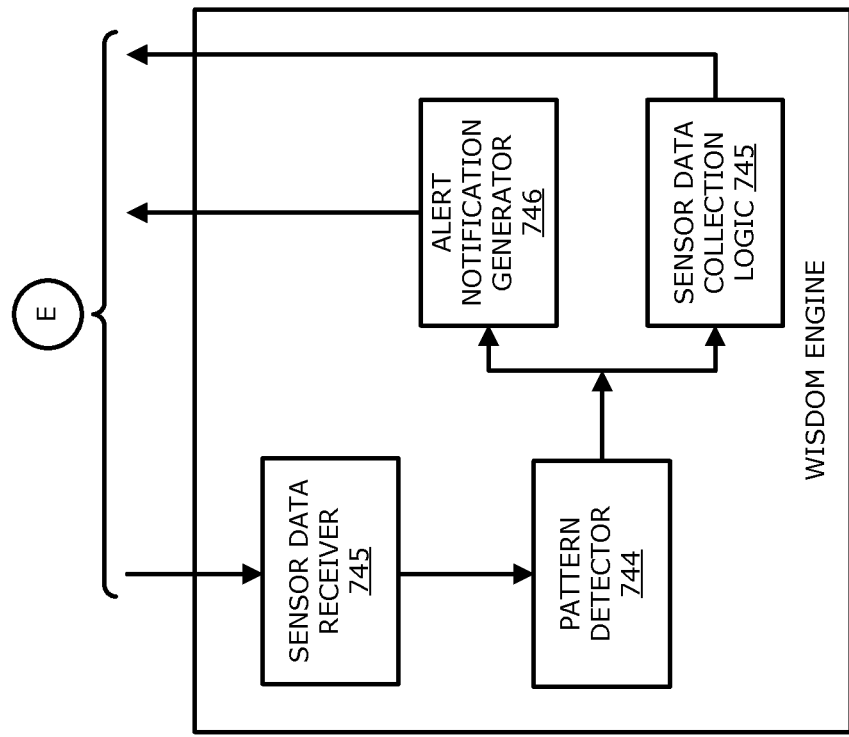
FIG. 7C is a third block diagram of a detailed sample architecture of the IGS 100.
Figure 7C:
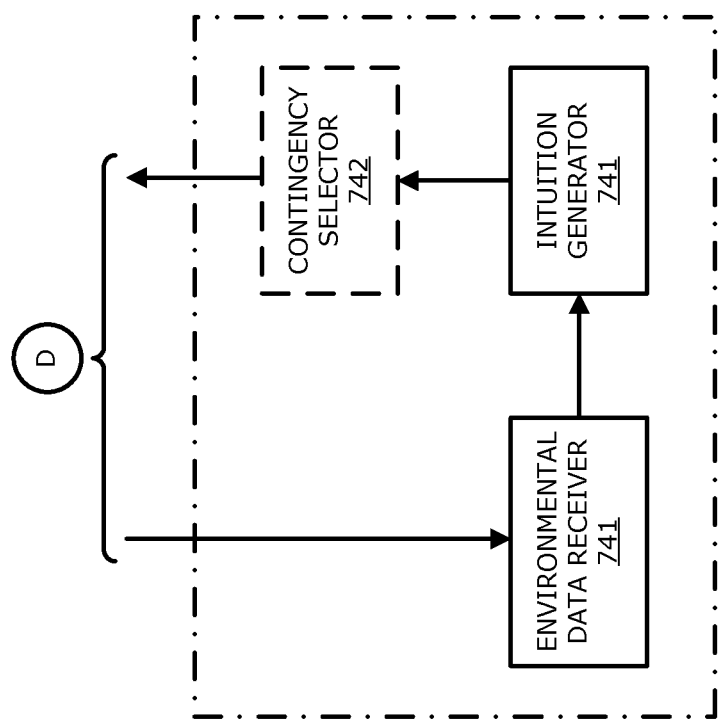

Referring to FIGS. 7A-7C, a block diagram of a detailed sample architecture of the IGS 100 is shown. FIGS. 7A-7C create a continuous architecture diagram such that inputs from FIG. 7A may flow to FIG. 7B, inputs from FIG. 7B may flow to FIG. 7C, outputs from FIG. 7C may flow to FIG. 7B, and outputs from FIG. 7B may flow to FIG. 7A. Each block illustrated in FIGS. 7A-7C may represent a software, hardware or firmware component acting in coordination with a general purpose electronic device of the IGS 110. Additionally, peripheral components such as an email server and/or a data source may be included in FIGS. 7A-7C to provide reference as to the inputs and outputs of the IGS 110.

In particular, FIG. 7A illustrates a services platform that may include the presentation platform 150 as illustrated in FIG. 1. As illustrated in FIG. 7A, the components 704-710 illustrate components of the IGS 100 that handle the reception of environmental data (which, as discussed above, includes one or more portions of the business application data and/or the big data), the filtering of the environmental data, the context-refinement of the environmental data and the transmission of the filtered and context-refined environmental data to the environmental data queue 724, as illustrated in FIG. 7B. Specifically, external environmental data adaptor 709 receives environmental data from the external environmental data source 703 (e.g., the business application database 111 and/or the big data database 112). In one embodiment, the scheduler services 710 provides the received environmental data to the environmental data ingestion services 708 through the service API 704 according to predetermined time intervals. The service API 704 may present the environmental data to the environmental data ingestion services 708 in a singular format (e.g., in an extensible markup language (XML) file or a hypertext markup language (HTML) file) such that the environmental data ingestion services 708 may easily filter the received environmental data as the external environmental data source 703 may provide the environmental data to the external environmental data adaptor 709 in a plurality of formats due to the environmental data potentially being derived from a plurality of databases.

The environmental data ingestion service 708 may perform operations similar to the business application intelligence module 122 and/or the big data intelligence module 123 of FIG. 1 by determining whether the received environmental data includes a significant change from the environmental data previously transmitted from the environmental data ingestion service 708 to the environmental detector service 707 and the environmental data queue 724 (via the data services API 720). The environmental data emergency detector service 707 may perform operations similar to the emergency detector 132 by analyzing at least a subset of the environmental data to determine whether an emergency is occurring or is imminent based on one or more predefined rule sets.

Upon detecting an emergency, the environmental data emergency detector service 707 may generate a notification and provide the notification to the environmental data context refinement service 706. The notification may include the type of emergency detected, the one or more rules whose application triggered the detection of the emergency and/or one or more variables from the sensor network 110A and/or the sensor database 110B. The environmental data context refinement service 706 may perform similar operations as the context-based refining engine 133 and obtain particularized environmental data based on the notification generated by the environmental data emergency detector service 707 by applying one or more predefined rule sets to the environmental data.

Referring to FIG. 7B, data from one or more of the environmental data ingestion service 708, the environmental data emergency detector service 707 and/or the environmental data context refinement service 706 may be provided to the environmental data queue 724, and/or a NoSQL database 727 by way of the data services API 720. The data services API may utilize a short message service (SMS) plugin to pass the data to the environmental data queue and a NoSQL plugin, and data obtained from the RDMS 726, to pass the data to the NoSQL database 727.

Referring to FIG. 7C, the environmental data queue 704 passes the data stored therein to the intuition generator 141 by way of the environmental data receiver 741. Upon generating an intuition, as discussed above, the intuition generator 141 provides the intuition to the notification queue 725 of FIG. 7B. The intuition is then passed through the data services API 720 to the environmental notification service 705 of FIG. 7A. The environmental notification service 705 may provide the intuition to one or more users 170 via an email server 701 and/or a SMS server 702. As discussed above, a UI may be generated, in this embodiment by the environmental notification service 705, to present the intuition as a UI to one or more users 170.

Referring to FIG. 7A, the components 712-717 illustrate components of the IGS 100 that handle the reception of sensor data, the filtering of the sensor data, the context-refinement of the sensor data and the transmission of the filtered and context-refined sensor data to the sensor data queue 733, as illustrated in FIG. 7B. In one embodiment, a historian database 711 provides sensor data to a historian database adaptor 716 which, through the scheduler services 171 as predetermined time intervals, provides the sensor data to the service API 714. The service API 714 may present the sensor data to the sensor data ingestion services 715 in a singular format such that the sensor data ingestion services 715 may easily filter the received sensor data as the historian database 711 may provide the sensor data to the historian database adaptor 716 in a plurality of formats.

The sensor data ingestion service 715 may perform operations similar to the sensor intelligence module 121 of FIG. 1 by determining whether the received sensor data includes a significant change from the sensor data previously transmitted from the sensor data ingestion service 715 to the sensor data queue 733. As discussed above, the sensor data ingestion service 715 may determine whether a significant change exists based on comparing the change between the current sensor data and the most recently sensor data transferred to the sensor data queue 733 to one or more predetermined thresholds (e.g., based on the percentage of change of one or more variables).

Referring to FIG. 7B, sensor data may be provided to the sensor data queue 733 by way of the data services API 728 using, in one embodiment, a SMS plugin based on the type of queue comprising the sensor data queue 733. Additionally, the sensor data may be provided to a NoSQL database 740 and subsequently be passed on to the data integration 735 and data virtualization 734 components prior to being passed to the presentation platform 150 as illustrated in FIG. 7A.

Referring to FIG. 7C, the sensor data queue 715 passes the sensor data stored therein to the wisdom engine 144. In particular, the sensor data receiver 743 receives the sensor which is passed to the pattern detector 744. The pattern detector 744 may utilize one or more predefined rule sets, algorithms, functions and/or equations such as any linear or nonlinear functions, quadratic equations, trigonometric functions (e.g., sine and cosine), polynomial equations or the like in order to determine whether a pattern is present in the sensor data. The pattern detector 744 may analyze the current sensor data in light of previous sensor data similarly stored in the sensor data queue 715. The pattern detector 744 may provide results of the pattern detection to an alert notification generator and/or sensor data collection logic 745. The combination of one or more of the outputs of the pattern detector 744, the alert notification generator 746 and the sensor data collection logic 745 may be referred to as an insight. The output of the alert notification generator 746 and the output of the sensor data collection logic 745 may be provided to the alert notification queue 732 and the ingestion management queue 731, respectively, as illustrated in FIG. 7B. The output of the alert notification generator 746 and the output of the sensor data collection logic 745 (cumulatively, an insight) may then be passed to event notification service 713 and the sensor context refinement service 712 using the data services API 728. The event notification service 713 may provide the insight to the email server 701 and/or the SMS server 702. As discussed above, a UI may be generated, in this embodiment by the event notification service 713, to present the insight as a UI to one or more users 170.

Figure 8:
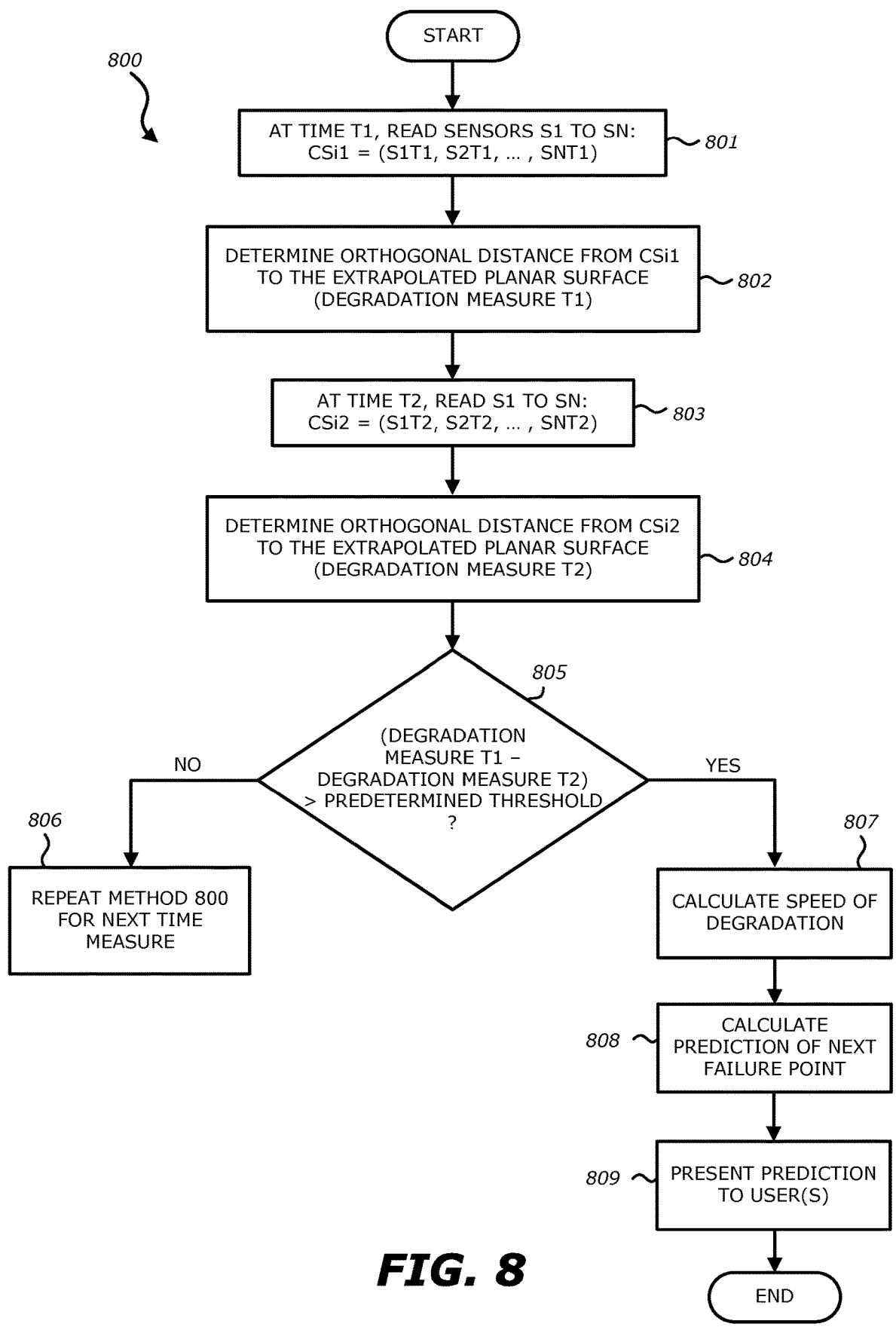
FIG. 8 is a flowchart of an exemplary process for predicting failure within a system by the wisdom engine 144 of the IGS 100 to generate an intuition.

Referring to FIG. 8, a flowchart of an exemplary process for predicting failure within a system by the wisdom engine 144 of the IGS 100 in order to generate an insight is shown. Each block illustrated in FIG. 8 represents an operation performed in the method 800 of predicting failure within a system is shown. The method 800 illustrates the process through which the wisdom engine 144 predicts a point of failure within a system (e.g., one or more pieces of equipment, wherein when the system includes two or more pieces of equipment, the two or more pieces may operate in a dependent manner or may operate in an independent manner). Upon predicting one or more failure points, the wisdom engine 144 may then generate an insight.

As an overview, each reading provided by a sensor of the sensor network 110A or the sensor database 110B at a particular time may be interpreted as a coordinate in a multidimensional space. For example, in an oil pipeline system, at a first time, four sensors (e.g., a thermometer, an intake pressure sensor, a vibration sensor, and a leakage current sensor) may provide a coordinate in multidimensional space corresponding to the reading of the four sensors: (e.g., 32° C., 200 lbs./sq. inch, 20 mm/sec., 0.2 amp). The orthogonal distance between this multidimensional coordinate and a multidimensional surface of previously known failure points (e.g., generated by surface, or curve, fitting techniques), may be determined. A second multidimensional coordinate may then be determined at a second time from the same four sensors. Upon determining the second multidimensional coordinate, the orthogonal distance between the second multidimensional coordinate and the multidimensional surface fitting of the previously known failure points may be determined. The orthogonal distances may then be compared to determine whether the orthogonal distance between the multidimensional coordinates is approaching the multidimensional surface fitting of the previously known failure points. The wisdom engine 144 may alert one or more users based upon the comparison of the orthogonal distances. Obviously, more or less than four sensors may be used.

Referring again to FIG. 6, at time T1, each of the sensors S1 to SN are read to determine a first coordinate point, CSi1, wherein CSi1=(S1T1, S2T1, . . . , SNT1) (block 801). At block 802, the wisdom engine 144 determines the orthogonal distance from CSi1 to an extrapolated multidimensional surface of previously known failure points (referred to hereinafter as the "degradation measure T1"). A failure point may be construed as a multidimensional coordinate corresponding to a point of failure of the system or equipment that was previously known, in other words, the sensor data when a failure previously occurred. Herein, the multidimensional surface fitting of previously known failure points may be done periodically by the wisdom engine 144 prior to the start of the method 800, the wisdom engine 144 may be initially configured with a multidimensional surface based on previously known failure points and/or the wisdom engine 144 may receive updates to the multidimensional surface based on new failure points from a network administrator, or the like, over the network 200.

At time T2, each of the sensors S1 to SN are read to determine a second coordinate point, CSi2, wherein CSi2=(S1T2, S2T2, . . . , SNT2) (block 803). At block 804, the wisdom engine 144 determines the orthogonal distance from CSi2 to the extrapolated multidimensional surface of the previously known failure points (referred to hereinafter as the "degradation measure T2"). At block 805, the wisdom engine 144 determines whether the difference between the degradation measure T1 and the degradation measure T2 is greater than a predetermined threshold, wherein the predetermined threshold may be dependent on the orthogonal distance of CSi1 to the extrapolated multidimensional surface of the previously known failure points. For example, the predetermined threshold used in block 805 may be a first value when a first orthogonal distance between CSi1 and the extrapolated multidimensional surface but would be a second, larger value orthogonal distance between CSi1 and the extrapolated multidimensional surface is a second value larger than the first value. In other words, in one embodiment, the closer CSi1 is to the extrapolated multidimensional surface, the smaller the predetermined threshold may be.

When the difference between the degradation measure T1 and the degradation measure T2 is not greater than a predetermined threshold (no at block 805), the method 800 starts again in order to compare the degradation measure T2 with a degradation measure T3 based on the readings of the sensor network 110A and/or the sensor database 110B at time T3, wherein time T3 is a time later than time T2.

When the difference between the degradation measure T1 and the degradation measure T2 is greater than a predetermined threshold (yes at block 805), the wisdom engine 144 calculates the speed of degradation (block 807). The speed of degradation is the change in degradation (difference between the degradation measure T1 and the degradation measure T2) divided by the time elapsed from T1 to T2. The speed of degradation is set forth in the equation below.

$$\text{Speed of degradation} = \frac{\text{degradation measure } T1 - \text{degradation measure } T2}{T2 - T1}$$

At block 808, the wisdom engine 144 calculates the prediction of the next failure point. Calculating the prediction of the next failure point is done by dividing the current degradation measure (e.g., the latest degradation measure, herein being the degradation measure T2) by the speed of degradation, which is set forth in the equation below.

$$\text{Prediction of next failure point} = \frac{\text{degradation measure } T2}{\text{speed of degradation}}$$

Upon calculating the prediction of the next failure point, the prediction is presented to the user(s) 170 (block 809). In addition to the prediction, the wisdom engine 144 may also present the user(s) 170 with the sensor data used in the prediction.

Intuition Based Forewarning System Using Relevance Scoring

Figure 9:
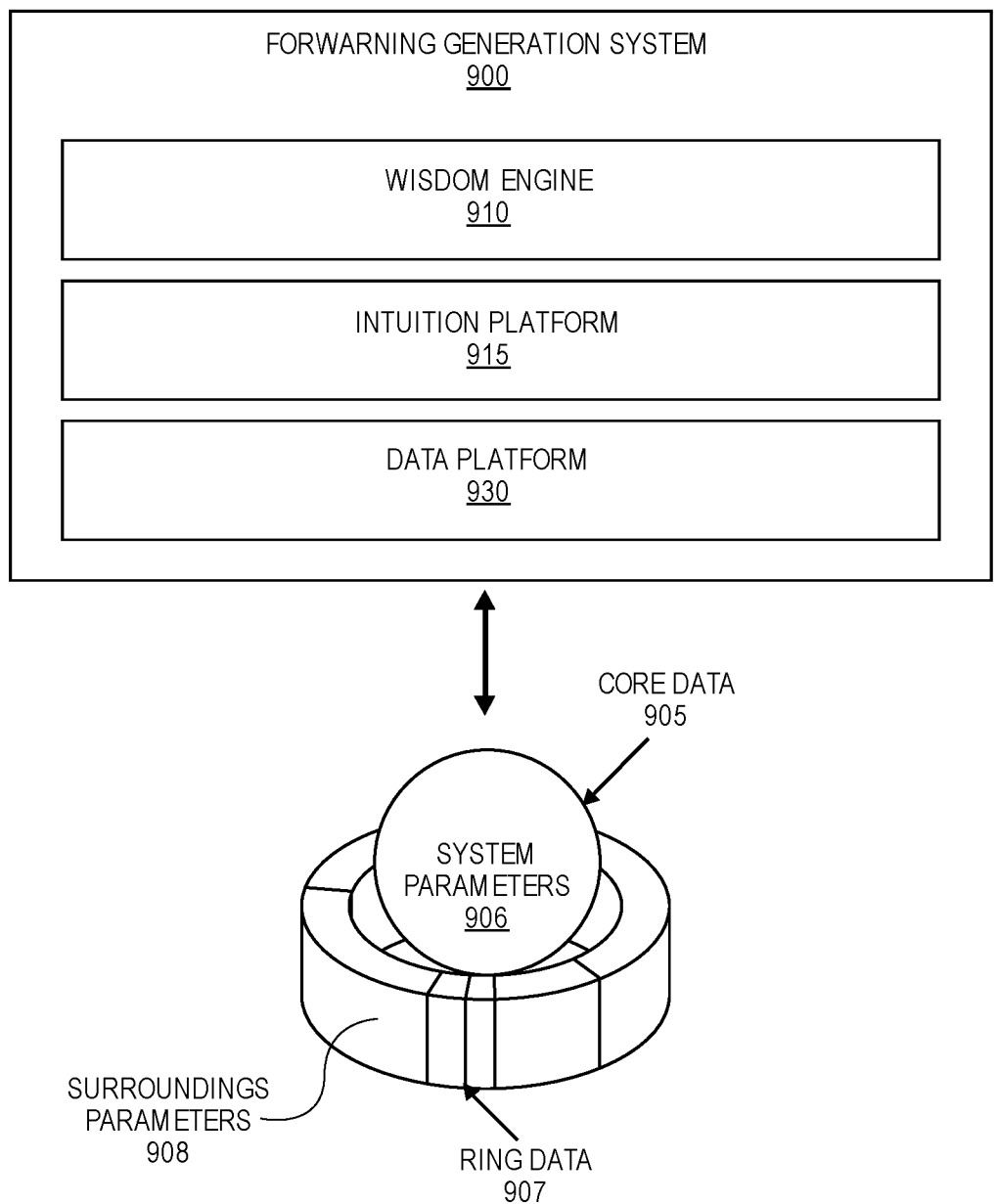
FIG. 9 is a block diagram of an exemplary forewarning intuition generation system (FGS) 900 communicatively coupled to a data platform 920 and data sources 905 and 907.

FIG. 9 is a block diagram of an exemplary intuition based forewarning generation system (FGS) 900 communicatively coupled to a data platform 920 and data sources such as core data 905 and ring data 907 related to a system (e.g., a data ecosystem). Similar to IGS 100 of FIGS. 1-2, for one embodiment, FGS 900 can be an electronic device configured for intuition based forewarning generation using the techniques described herein. In other embodiments, FGS 900 may be software, hardware or firmware acting in coordination with a general purpose electronic device or computer. In yet other embodiments, FGS 900 may be contained with an individual processor, an embedded microcontroller, a microchip, or the like and be comprised of multiple components, modules or applications such as wisdom engine 910, intuition platform 915 and data platform 930. Core data 905 includes system parameters 906 describing the system and ring data 907 includes surroundings parameters 908 describing surroundings of the system. System parameters 907 can describe a system including measured and monitored values and parameters related to a data ecosystem (e.g., tracking inventory and sales at a distribution center). Surroundings parameters 906 can describe surroundings of the data ecosystem such as weather information, environmental information or big data stored in big data database 112 in FIG. 1.

For one embodiment, FGS 900 includes a wisdom engine 910 and intuition platform 915 and a data platform 920 collecting and storing core data 905 and ring data 907 related to the system. Core data 905 and ring data 907 can include structured or unstructured information obtained in a time or series or at random times. Core data 905 and ring data 907 can include varying types of data such as, e.g., Internet-of-Things (IoT) type of data derived and generated from interconnected computing devices and data processing systems. Intuition platform 915 is configured to process and analyze the core data 905 and ring data 907 and to sense one or more changing situations of the system or situational changes based on the core data 905 and ring data 907. For one embodiment, intuition platform 915 provides data to wisdom engine 910 to compute and generate relevance scores for hypotheses outcomes based on situational change of the system. For one embodiment, wisdom engine 910 is configured to use the relevance score for each hypothesis in determining to output a forewarning to a user. For instance, wisdom engine 910 can correlate each determined situation with one or more hypotheses outcomes representing a future system state based on the relevance score. Wisdom engine 910 can also generate a system forewarning to one more users based on the correlated hypotheses outcomes. For example, wisdom engine 910 can send a forewarning to one or more users via a mobile device, computing device or a computing system connected to a cloud system that can distribute the forewarning to any number of users.

The disclosed forewarning techniques implemented by FGS 900 can recognize early signs from situational changes in a system and its surroundings to predict an upcoming event and its time frame. Correlating situational changes with system state outcomes poses an inherent challenge because the impact on the system state may not be observed immediately. For example, if people change their diet, the impact of that diet change may not reflect on their health immediately. That is, it may take several months before effects of the diet change can be seen. Similarly, situational changes to a system may not have any effect on a system state immediately, but the effects may be seen or noticed at a later time. This delay between a situational change or action and its effect gives rise for an opportunity to provide adequate forewarning of a future system event.

To achieve such a forewarning, FGS 900 generates a relevance score for the situational changes and those changes can be correlated with a system state outcome based on the relevance score. This can assist in gaining forewarning time to a person or user of an event early on to address sluggish or delayed behavior of a system, which may not be able to react quickly to the event. For one embodiment, a relevance score is the ratio of a quantified measure of changes in hypotheses outcome (i.e., representation of a future system state outcome) to current situational changes based on the core data and ring data. Such forewarning techniques can assist in gaining time to forewarn a person or user or person of an event early on to address any sluggish behavior of a system which may not be able to make decisions quickly. The disclosed techniques can also bridge human experience and machine learning using hypotheses management and analysis with relevance scoring.

Figure 10:
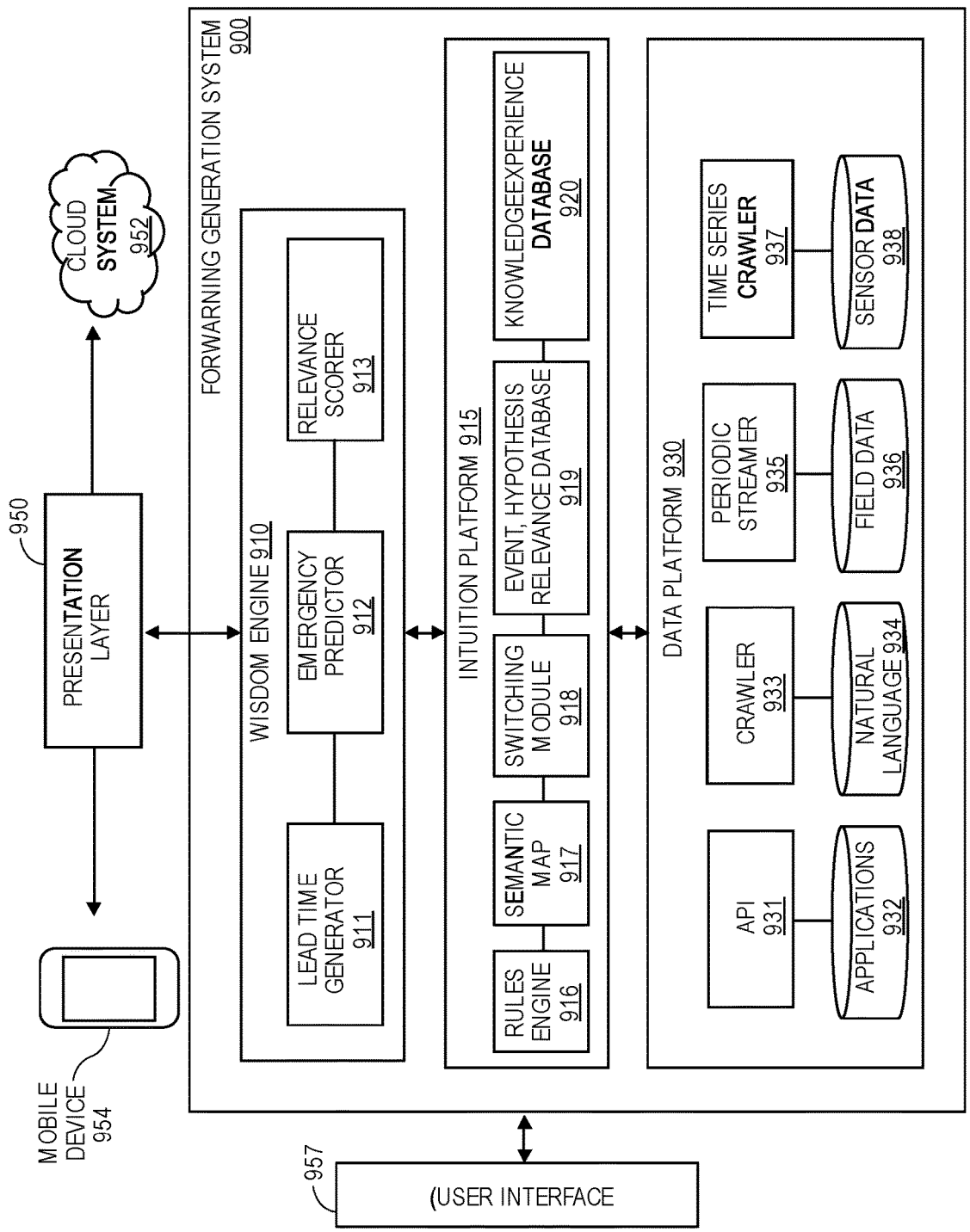
FIG. 10 is a detailed block diagram of the FGS 900 communicatively coupled to a presentation layer 950 to present forewarnings to one or more users.

FIG. 10 is a detailed block diagram of the FGS 900 having data platform 930, intuition platform 915 and wisdom engine 910 communicatively coupled to a presentation layer 950 to present forewarnings to one or more users. For one embodiment, FGS 900 can be implemented on a server or a stand-alone computer or computing system. In other embodiments, FGS 900 can be hosted on a cloud computing system such as Microsoft Azure® and IBM Bluemix® cloud systems. For one embodiment, FGS 900 can be trained using historical data and events with known and existing machine learning techniques to provide real-time forewarning to one or more users via presentation layer 950.

Data Platform

For one embodiment, data platform 930 is configured as a data ingestion layer of core data 905 and ring data 907, which can be structured, unstructured or semi-structured data that is collected into data platform 930. For example, structured data can be collected from applications and ingested and stored as applications data 932 using different application program interfaces (APIs) 931. Unstructured data can be collected from natural language sources as natural language data 934 using crawler 933. Semi-structured data can be collected from field data sources and sensors and stored as field data 936 and sensor data 938 suing periodic streams 935 and time series streamers 937. For one embodiment, sensor data 938 can be collected directly from sensors or from a database storing sensor measurement and values or from IoT messages in which sensor measurements are parsed. For one embodiment, sensor data 938 from time series crawler 937 can be collected based on conventional evaluation techniques for determining a value of information (VoI) and the degree and speed of changes of the sensor readings and data. For example, standard measures such as expected value of sample information (EVSI) and the expected net gain of sampling (ENGS) can be used for this determination.

Intuition Platform

For one embodiment, intuition platform 915 can combine intelligence from core data 905 and ring data 907, which can be stored as applications data 932, natural language data 934, field data 936 and sensor data 938, and compute relevance scores, which are passed on to wisdom engine 910 to generate forewarnings. For one embodiment, intuition platform 915 is configured to manage hypotheses outcomes and to converge the hypotheses outcomes to reliable forewarning guidelines through iterations as described in more detail below regarding FIGS. 11A-11B. For one embodiment, intuition platform 915 includes a number of modules running applications and logic such as processes rules engine 916, semantic map 917, switching module 918 and includes databases and database systems such as event, hypotheses relevance database 919 and knowledge and experience database 920. Databases 919 and 920 can be any type of databases such as structured query language (SQL) and relational database management system (RDBMS) databases.

For one embodiment, knowledge and experience database 920 can store core data 905 and ring data 907 and derivative information, knowledge or assets from core data 905 and ring data 907 such as, e.g., patterns, trends and human experiences related to a system. For example, database 920 can store isolated pattern templates and trend templates with situational conditions as described in FIGS. 15A-15C. For one embodiment, database 920 can store outputs from natural language processing (NLP) of natural language data 934, which can be perceptions of the human mind described in a qualitative way. Database 920 can also store data that can describe the qualified context with a converted quantified value of different situational conditions.

For one embodiment, event, hypotheses and relevance database 919 can store historical data and events, hypotheses outcomes and measures of relevance scores related to the hypotheses outcomes of the system for both processing and record keeping purposes for forewarning generation system 900. For one embodiment, when historical data is analyzed, database 919 can associate events (e.g., a machine breakdown) to isolated patterns which may have been seen before in core data 905 and ring 907 along with a relevance score. Hypotheses can be evaluated for each isolated data pattern stored in database 919.

For one embodiment, switching module 918 is configured to detect when a system or target system deviates from normal operation and moves towards an emergency situation or event and notifies emergency predictor 912. For example, switching module 918 can identify for FGS 900 if an emergency is ahead or forthcoming. Switching module 918 can map isolated patterns in sequence and link them with the isolated patterns from historical data analysis results stored in databases 919 or 920.

For one embodiment, rules engine 916 can store rules (e.g., situational rules) that are defined or modified by the domain experts or users. Rules engine 916 can also store guidelines (or rules) that are generated from converting machine learned situational observations into a set of normal and abnormal behavioral conditions, which can be used for signaling from normal operation or system behavior to abnormal or emergency conditions, events or states. For one embodiment, rules engine 916 can be configured to analyze and evaluate, e.g., data from data platform 930 for pattern isolation using thresholds or logical conditions such as true or false. For example, rules engine 916 can be a programmed module, e.g., written in Java, that can be manually configured or programmed (or made adaptable to conditions) and receives input values or logic from core data 905 and ring data 907 to determine if certain conditions are met and outputs the results as a service. Rules engine 916 can be used for hypotheses iterations to determine if a hypothesis holds up using relevance scores.

For one example, semantic map 917 is configured to process unstructured data and generate contexts and maps the contexts to the unstructured data using qualitative information. For one embodiment, semantic map 917 is used in conjunction with crawlers 933, 935 and 937 and can be developed separately for each use case that requires natural language processing. For example, semantic map 917 can be used to define the contextual ontology used for natural language processing. Semantic map 917 can use a word map that associates, inherits or subgroups various words to build a context of a situation and its conditions. For example, natural language processing can match with a word in semantic map 917 (e.g., "ball-bearing noise") and understand the contextual situation related to ball-bearing noise.

For one embodiment, system parameters 906 of core data 905 and surroundings parameters 908 of ring data 907 (core or ring variables) can be identified by domain experts or users using user interface 957 coupled to forewarning generation system 900. For example, core and ring variables can be chosen such that they collectively represent current and future states of a target system or data ecosystem (system) and surrounding situations or conditions of the system. For one embodiment, once core and ring variables are identified, the identified variables are then linked to a set of hypotheses outcomes which represents or projects a future system state. Machine learning techniques can be used to identify model instances that best characterize observations such as neural networks and decision trees. The hypotheses outcomes can be correlated with observed situational changes during historical event analysis, which an be combined with known or existing machine learning techniques. Upon completion of historical even analysis, hypotheses outcomes can be refined to improve identifying conditions that can signal a target event.

Wisdom Engine

For one embodiment, wisdom engine 910 includes a number of modules running applications and logic such as lead time generator 911, emergency predictor 912 and relevance scorer 913. For one embodiment, lead time generator 911 is configured to analyze historical data and events and generates pattern and trend templates from ingested core data 905 and ring data 907 from data platform 930 passed on from intuition platform 915. For one embodiment, trend templates can be machine learned or simulated using numerical methods. For each hypotheses refinement, trend templates can also be refined and adjusted. Lead time generator 911 can store isolated patterns and trends based on the trend templates, which can be used to determine hypotheses outcomes, in knowledge and experience database 920. For one embodiment, human interpretation of results can be provided by user interface 957 including comments in natural language that are processed using semantics and stored in knowledge and experience database 920.

For one embodiment, emergency predictor 912 is configured to identify deviation from normal trend trajectory to abnormal trajectory and ring data patterns supporting consistency of the change. For one embodiment, relevance scorer 913 is configured to generate relevance scores which are ratios of quantified measure of changes in hypotheses outcomes to one or more situational changes to a system using core data 905 and ring data 907 as described herein. Relevance scorer 913 can calculate the relevance scores for hypotheses using core data 905 and ring data 907. For one embodiment, if the relevance score is below a degree of sensitivity, the data model chosen by ring datasets may be refined.

For one embodiment, relevance scores can be used to identify when a system forewarning should be generated. Relevance scorer 913 can also generate inferences based on the relevance scores and can point out or signal missing elements in data space created by core data 905 and ring data 907. Relevance scorer 913 can operate with event, hypotheses relevance database 919 and rules engine 916 to generate the inferences. Relevance scorer 913 can also signal missing elements when a forewarned hypotheses outcome deviates repeatedly from observed events beyond justification or acceptable limits. For one embodiment, relevance scorer 913 can use value of information (VoI) techniques to determine if outcomes have been untraced or if data space has a void.

For one embodiment, in operation, e.g., during real-time mode, emergency predictor 912 is configured to receive core data 905 and ring data 907 in pre-processed queues from data platform 930 and applies trend and pattern templates generated by lead time generator 911 and rules and algorithms using relevance scores to determine if a system forewarning should be generated. Such rules and algorithms can be based on neural network techniques and pattern isolation concepts. Emergency predictor 912 can send forewarning alerts to presentation layer 950 that can distribute the forewarning alerts to one or more users to mobile device 954 or to cloud system 952. For example, a display on mobile device 954 can output a forewarning alert or applications connected to cloud system 952 can receive forewarning alerts.

Intuition Based Forewarning Operations Using Relevance Scoring

Figure 11A:
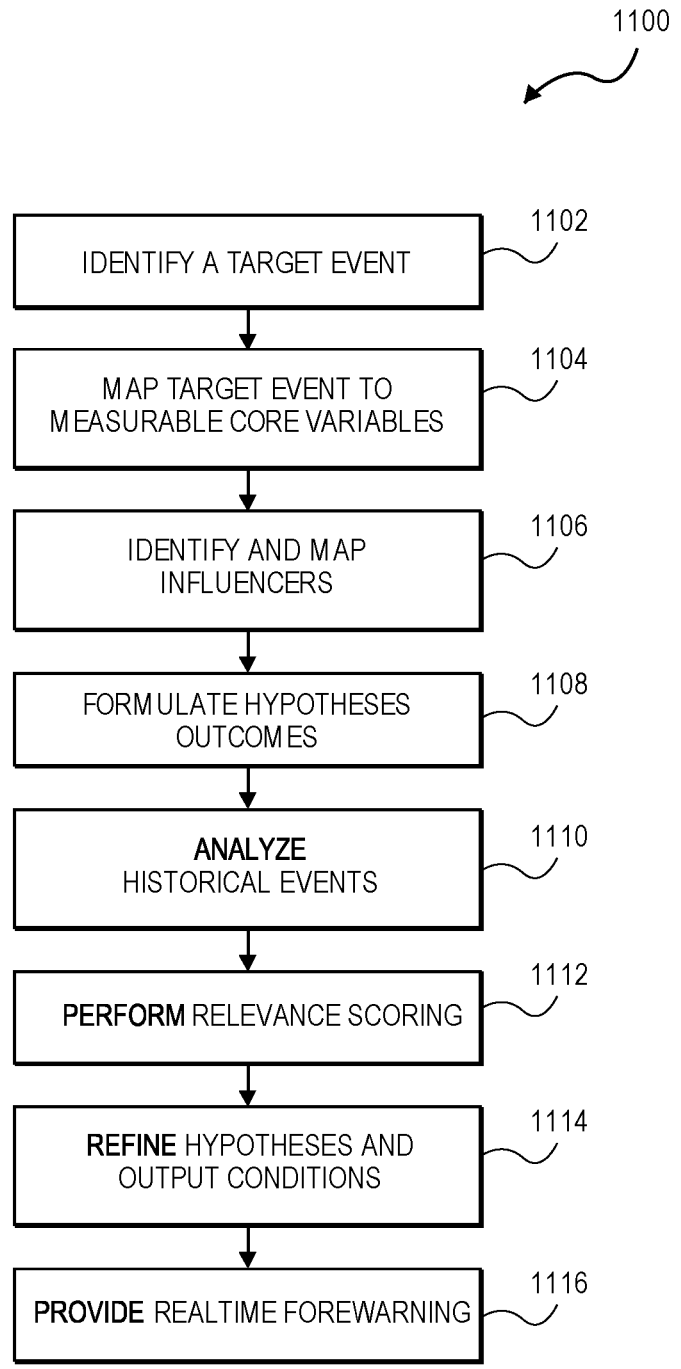
FIG. 11A is a flowchart of an exemplary intuition based forewarning generation process 1100 using relevance scoring.

FIG. 11A is a flowchart of an exemplary intuition based forewarning generation process 1100 using relevance scoring having blocks 1102 through 1116. Process 1100 including blocks 1102 through 1116 can be implemented by FGS 900 of FIGS. 9-10 in providing an intuition based forewarning operation. Process 100 involves defining input variables, intermediate processed parameters, and the measured outputs. For one embodiment, core data 905 are linked to System of Interest (SoI) parameters and ring data 907 can be used influencers to SoI behavior. Influencers can be used to impact future value of care data 905 variables. In the following examples, for each use case, a target event can be broken down into a set of hypotheses expressions describing a future system state.

At block 1102, a target event is identified. For one embodiment, a target event sets forth a desired forewarning having an expression—e.g., Is the system failing? The target event can be used to identify what needs to performed by a system or should be prevented from occurring in a system—e.g., turning on back-up power.

At block 1104, the target event that is identified in block 1102 is mapped to measurable core data 905 variables (core variables). For one embodiment, the target event is quantified with variables that can be measured against conditions that are set to indicate the identified target event—e.g., Is the power level above X? For one embodiment, core variables can correlate with a target system state, e.g., power level variable can correlate with a system being on or off.

At block 1106, influencers are identified and mapped to a state of changing surroundings of a system. For one embodiment, influencers are ring data 907 variables (ring variables) that represent the state of changing surroundings of the system. In one example, a user by way of user interface 957 can configure specific ring variables to map to surroundings parameters 908. For example, a user can map ring variables to specific applications data 932, natural language data 934, field data 936 and sensor data 938 stored in databases 919 and 920 or from data platform 930.

At block 1108, hypotheses outcomes are formulated. For one embodiment, a forewarning goal can be divided into smaller sets of hypotheses and conditions mapped to variables of core data 905 and ring data 907. Hypotheses outcomes can be quantifiable, computable, measurable and logically evaluated. For one embodiment, hypotheses outcome expressions can be as simple as evaluating core data 905 or ring data 907 readings against a threshold, or as complex as a formula derived from scientific theory or polynomial derived from curve fitting exercise. For other embodiments, hypotheses outcome expressions can be logical expressions based on previous experience of system states and outcomes.

At block 1110, historical events are analyzed. For one embodiment, core data 905 and ring data 907 from previous historical events are ingested for training to identify the degree of impact each influencer has on hypotheses outcomes indicating early warning of the target event. During training, for one embodiment, wisdom engine 910 runs lead time generator 911 which can run algorithms to carry out extrapolation and pattern isolation of ingested core data 905 and ring data 907.

At block 1112, relevance scoring is performed. For one embodiment, each hypotheses outcome has an initial and pre-defined relevance score and a new relevance score can be calculated each time there is a new pattern identified in the ingested core data 905 and ring data 907 and stored in database 920 along with the time stamp and isolated pattern. For one embodiment, if a relevance score is beyond a pre-determined threshold, FGS 900 can determine that a new situation has been encountered. For another embodiment, if the relevance score varies widely and consistently, FGS 900 can determine new machine learning models may need updated or improvement. For one embodiment, domain experts or users can identify core and ring variables and to make necessary adjustment to update the models.

At block 1114, hypotheses and output conditions are refined. For one embodiment, hypotheses and output conditions can be refined based on historical data and event analyses and isolated pattern trends. For example, conditions and thresholds of the outputs can be further refined accordingly in which forewarning hypotheses can be improved to map to various situation conditions that are experienced.

At block 1116, real time forewarning is provided. For one embodiment, once intuition platform 915 is trained with historical data, intuition platform 915 is equipped for real time forewarning for wisdom engine 910. During real time forewarning, lead time generator 911 can initiate monitoring, filtering and forewarning based on situational changes if such situations have been experienced before by FGS 900. For one embodiment, if an unknown situation is sensed by relevance scorer 930, the situation is recorded and notification can be sent out immediately for domain experts to intervene.

Further details of the operations of blocks 1102 through 1116 for process 1100 are provided below.

Figure 11B:
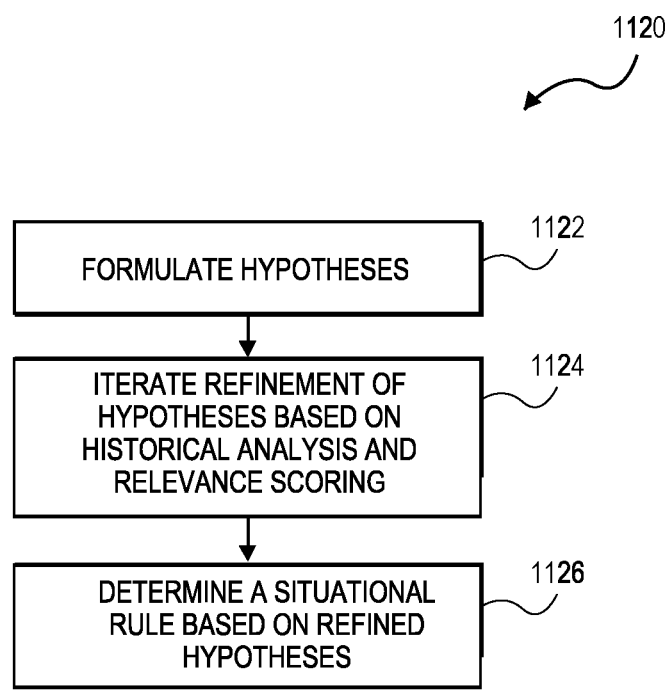
FIG. 11B is a flowchart of a exemplary process 1120 to determine a situation rule based on refined hypotheses.

FIG. 11B is a flowchart of a exemplary process 1120 to determine a situation rule based on refined hypotheses. Process 1120 including blocks 1122 through 1126 can be implemented by FGS 900 of FIGS. 9-10

At block 1122, hypotheses are formulated. For example, for certain situational changes, hypotheses for a certain system state can be formulated, e.g., oil level low.

At block 1124, refinement of hypotheses is iterated based on historical analysis and relevance scoring. For example, if a relevance score is low for hypotheses, the hypotheses may not be relevant any longer and can be removed or modified by a domain expert or user.

At block 1126, a situational rule can be determined based on the refine hypotheses after a certain number of iterations. For example, if a hypothesis continues to have a high relevance score historically, the hypotheses can be converted to a situation rule, e.g., oil level at X is at danger level needs to go to Y level.

For one example, machine learning models such as neural networks or decision trees can be used with the historical data to determine a situational rule. Various pattern isolation and trend extrapolation algorithms can be used depending upon the use case. In bridging human experience with machine learning, human perception of a situation can gathered (either in real time, or while reviewing historical data driven scenarios) and then attach it to the isolated pattern time stamp. The semantic 917 can give an indication of the situation (e.g., cold or dark) which also has an assigned and unique quantifiable value. Time stamps can be used as a link to bridge the human perception of a situation with the machine analyzed situation (e.g., isolated data patterns). With time, the situations will keep repeating and conditions will be further mapped. This is, for example, when the forewarning lead time would be ahead of other systems and also much higher in accuracy.

Target Events and Core Variables

For one embodiment, target events that are identified in process 1100 in which forewarning is desired can be qualitative or quantitative in nature. Examples of a qualitative target event can be: "Is the machine going to fail soon?" Examples of a quantitative target event can be: "Is the contamination level of the oil crude sample above X level?". For one embodiment, a qualitative target event can be decomposed on to a set of quantifiable expressions consisting of core data 905 variables (core variables) that can be monitored and compared logically. For one embodiment, a quantifiable target event can be simply monitored such as if a measured level is above or below a level and outputting core variables that creates a multivariate space. For one embodiment, breaking down a target event into measurable core variables can use domain expertise and an output expression for a target event can be a single dimensional array of core variables monitored against threshold values. In other embodiments, an output expression may include expressions containing several core variables (e.g., a matrix of core variables) and their time derivatives, which can be evaluated against pre-set conditions.

Historical Core Data Analysis with Trend Training Algorithm

For one embodiment, core data 905 and core variables are fed into lead time generator 911 of wisdom engine 910 as a time series for multivariate analysis. Lead time generator 911 can analyze core data 905 and core variables using known machine learning techniques, e.g., artificial neural networks (or convolutional neural networks) to extrapolate core data outcomes. The outcomes can be fine-tuned by adjusting weights during iterations of analyzing the core data 905 and core variables and trend templates by using machine learning techniques. For example, referring to FIG. 12A, an exemplary Time Series of Core Variables and Extrapolated Outputs Table 1200 is shown. Table 1200 shows time stamps 1201 having 1 through m time stamps and contains p core variables 1202 that indicate a state of interest of a system. Table 1200 also shows core data projected values 1203 of each core variable after time T.

Referring to FIG. 12A, for one embodiment, Table 1200 shows extrapolated future value of $i^{th}$ Core variable at $t_{m+T}$ instance expressed by $P_{itm+T}$ and actual reading of the same variable is expressed by $C_{itm+T}$. Both quantities of $P_{itm+T}$ and $C_{itm+T}$ can be compared to determine accuracy of prediction. To further understand Table 1200, image pressure, temperature and viscosity are three (3) core variables that are sampled at 1 sec interval for a duration of 1 hour. In this example, this means there will be 3,600 pressure data points, 3,600 temperature data points and 3,600 viscosity data points. In this case, $t_m$=3600 and p=3 (variables). The time series is illustrated by core variables 1202, and each row can represent 3,600 sample values. For one embodiment, when lead time generator 911 applies a training algorithm on ingested core data 905 and variables, lead time generator 911 can generate projected values for each of the 3 core variables in this example at a future time T (e.g., if T=15 mins then the time stamp $t_{m+T}$=4500).

Historical Core and Ring Data Analysis for Pattern Isolation

For one embodiment, core data 905 and core variables and ring data 907 and ring variables are fed into lead time generator 911 for pattern isolation. Lead time generator 911 can use an algorithm configured to track changes in variable value and to derive rate of changes and acceleration of changes of the values that can be compared against threshold values. For one embodiment, patterns that are beyond accepted thresholds can be isolated and stored along with respective time stamps in knowledge, experience database 920. For one embodiment, rules engine 916 can identify unique isolated patterns and convert them into a set of rules conditions that can be evaluated with real time core data 905 and ring data 907 for wisdom engine 910 to generate a forewarning. For one embodiment, during pattern isolation, historical time series data can be filtered and non-useful data eliminated. For one embodiment, only time stamp values are stored that satisfy sudden changes in data values, rate of change or acceleration of change over a pre-determined threshold. Such isolated patterns can be represented by a sparse matrix of isolated patterns and stored in database 920.

Take FIG. 12B, for example, a Core Data, Ring Data and Isolated Patterns Table 1205 is shown for one historical event time series. It should be noted that a historical event analysis requires backtracking and scanning the time window prior to the event. That is, a scanned window time series data can give rise to m time stamps 1206 and consists of p core data variables 1207 represented by "C" and q ring variables 1208 represented by "R." For one embodiment, lead time generator 911 in wisdom engine 910 can run a training algorithm to compute speed and acceleration of changes in core data 905 or ring data 907 and check those measurements changes against pre-set thresholds.

For example, $\dot{C}_{ptn}$ can represent the rate of change of $p^{th}$ core variable at the $n^{th}$ timestamp where the changes recorded are above the pre-set threshold set. Similarly, $\ddot{C}_{itk}$ can be the $i^{th}$ core variable at the $k^{th}$ timestamp for which the acceleration of value changes is greater than the pre-set threshold set. Thus, $\dot{R}_{stx}$, $\ddot{R}_{xtf}$ can express equivalent rate change expressions for the ring data variables 1208. Such isolated patterns can be saved in database 920 which can be based on one time series as sparse patterns matrix 1209 $\dot{C}_{ptn}$, $\ddot{C}_{itk}\dot{R}_{stx}$, $\ddot{R}_{xtf}$. These patterns can be lined by time series ID and time stamp 1206.

Hypotheses Outcome Formation and Relevance Scoring

Hypotheses outcome formation and relevance scoring is explained with reference to FIG. 12C showing a Hypotheses and Relevance Scoring Table 1210. It should be noted that hypotheses are unproven guesswork, however with iterations they can form guidelines that can be dependable. For one embodiment, FGS 900 can form hypotheses outcomes indicating forewarning conditions and mapping them to core data and variables and ring data and variables along with associated rate changes and acceleration changes.

For one embodiment, historical event analyses can assist in refining initial hypotheses outcomes by changing conditions, thresholds, or by adding new variables that may be alerted as missing from the relevance scoring calculations. For example, referring to Table 1210, take d hypotheses that are framed using core and ring variables 1212, represented by H, a matrix of evaluated hypotheses 1214 is provided at each timestamp 1211. At each time stamp t1 to tx, when pattern isolation conditions are satisfied indicating that a new pattern is found, a relevance score 1215 matrix S is calculated.

For one embodiment, a relevance score is the ratio of per-unit deviation of computed hypotheses outcomes between subsequent time stamps over the subsequent changes of per-unit core and ring data values cumulated over all variables. In other words, relevance scores can give a measure of the situational impact on the hypotheses, which in turn can benchmark sensitivity of the situational changes to the target event.

For example, during historical event analysis, a target event can be known and situations can be backtracked to find situations that may have led to such event. For one embodiment, a relevance score of $k^{th}$ hypothesis at $j^{th}$ timestamp $S_{Kj}$ can be computed as follows:

$$S_{Kj} = \frac{\frac{\Delta\|Hktj - Hktj-1\|}{Hktj}}{\sum_{i=1}^{p}|\Delta\|(Citj - Citj-1)\|/Citj\| + \sum_{i=1}^{q}|\Delta\|(Ritj - Ritj-1)\|/Ritj1|}$$

where $H_{ktj}$ is the observed or computed outcome of $K^{th}$ hypothesis at the $j^{th}$ timestamp. $C_{itj}$ can represent core data values of $i^{th}$ parameter at the $j^{th}$ timestamp and $R_{itj}$ can represent ring data value for the $i^{th}$ parameter corresponding to the same $j^{th}$ time stamp.

For one embodiment, to obtain homogeneity across historical data runs, data values can be normalized and expressed in the percentile of the maximum value of that variable in that historical data series. Changing relevance scores can be tracked and stored in database 919 at intuition platform 915. In this way, a set of hypotheses outcomes can be framed to provide forewarning conditions to be provided to the presentation layer 950.

Hypotheses Refinement

Figure 13:
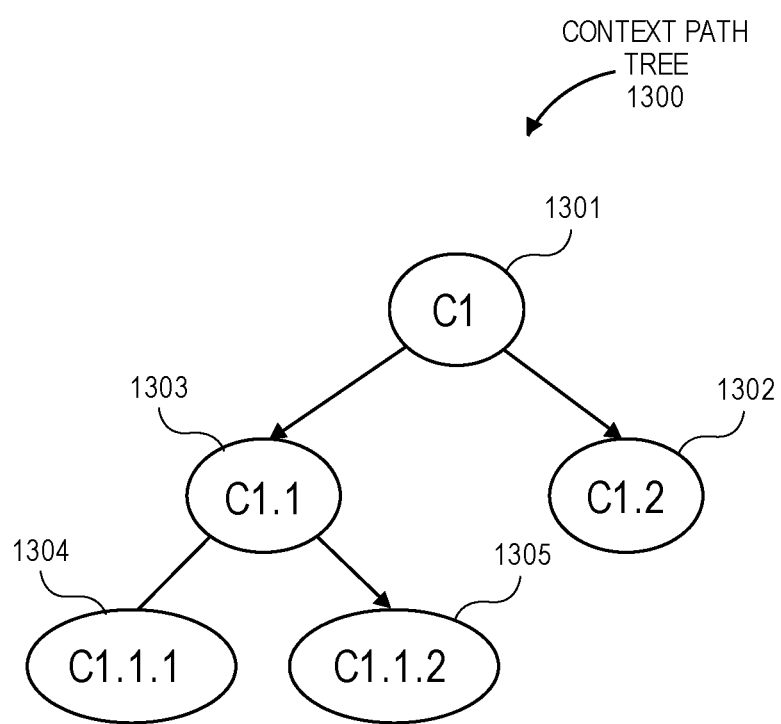
FIG. 13 is an exemplary context path tree 1300.

For one embodiment, hypotheses outcomes can be refined in two ways. First, by adding new variables which were absent before. Second, by fine-tuning the rules conditions. For example, new rules can be implemented using old core and ring variables or adjusting rules conditions, which can be adjusted at the end of a historical event run. For one embodiment, FGS 900 can implement multi-hypotheses tracking (MHT) or other techniques to track changes in situational parameters (e.g., value, rate and acceleration of changes) and correlates these changes with the observed hypotheses outcomes. As more core data 905 and ring data 907 are ingested into FGS 900, additional new conditions can be discovered and different situational conditions can translate into context paths identified by C1, C1.1 etc. (1301-1305) of FIG. 13 showing an exemplary context path tree 1300. As the context path tree 1300 develops and the tree branches become establishes, knowledge experience database 920 can store more developed forewarning information under different situations, which can improve forewarning accuracy significantly. Database 920 can store domain expert or human interpretation of a situation that uses the natural language by way of user interface 957. Information in database 920 can be connected or correlated to timestamp or time series identification (IDs). As the information in database 920 becomes more developed, the stored information overlaps more with situation contexts including context paths as illustrated in FIG. 13 which can be combined with machine learning techniques to provided improved system intuition based forewarnings.

Lead Time Forewarning Generation

FGS 900 can provide lead time forewarning generation using lead time generator 911 as part of wisdom engine 910. Lead time generator 911 can provide forewarning in real time by ingesting core data 905 and ring data 907 and associated parameters 906 and 908 and implementing forewarning algorithms which extrapolates core and ring data variables using trend templates to identify abnormal patterns in the core and ring data variables.

For one embodiment, wisdom engine 910 and lead time generator 911 can address three different possibilities.

First, one possibility is if no pattern is found from core data 905 and ring data 907 to indicate a forewarning condition and extrapolation of core data 905 or variables consistently gives projected values within accepted error tolerance. In such a case, a system can be considered to operating or behaving normally following standard predicted paths and situational changes are not indicating abnormal or alarming events.

Second, isolated patterns match with stored patterns in database 920 and forewarning conditions are traced. In this case, for one embodiment, situational changes affect future outcomes of the system and a lead time to event is calculated and a forewarning is issued by wisdom engine 910.

Third, new patterns are isolated but do not match with stored patterns in database 920, but relevance scores indicate a correlation between situational changes and hypotheses outcomes. In such a case, for one embodiment, wisdom engine 910 can issue a forewarning and a lead time is calculated using stored trend templates that is closest to the current relevance score.

Lead Time Algorithms

For one embodiment, lead time generator 911 can implement lead time algorithms in including (1) lead time training algorithms (LTTA) and (2) lead time forewarning algorithms (LTFA). For one embodiment, lead time generator 911 implements LTTA for historical event and data analysis. The outputs of LTTA can be stored in database 920. LTTA can be divided into two types of algorithms such as lead time trend training (LTTT) and lead time pattern isolation (LTPI). For LTTT, lead time generator 911 can run applications and can be use case agnostic and configured in a way such that inputs and outputs are standardized through a meta-layer set of bind variables. For one embodiment, lead time generator 911 applies LTTT on core variables that generates outputs. For one embodiment, LTTT can be configured and associated with different trend generating procedures depending upon case use. For one embodiment, these procedures are registered in the wisdom engine 910 prior to association with LTTT. Wisdom 910 can implement newly added procedures at any time and an old procedure can be replaced with a new one. Trend procedures that can be implemented by wisdom engine 911 include long short-term memory (LSTM) procedures and tensor flow procedures. For one embodiment, LTPI can be configured in the same way as LTTT where inputs, outputs, and meta-layer of binding variables are case independent. Similarly, LTPI can also be configured and associated with different pattern isolation procedures. For LTFA, lead time generator 911 can run applications that can be used only for real time forewarning generation. The outputs of LTFA can be used by emergency predictor 912 of wisdom engine 910 to forward system state forewarnings to presentation layer 950 that can output forewarnings to any number of users via mobile device 954 and cloud system 952.

FOREWARNING USE CASE AND NUMERICAL EXAMPLES

The following provides two case examples of a qualitative target event such as—e.g., (1) Rig Equipment Failure Forewarning and (2) Wireline Formation Sample Contamination Forewarning.

Rig Equipment Failure Forewarning Example

For this example, a system goal can be to prevent the failure of the critical equipment used in oil rig—such as, e.g., rotating machines. That is, a forewarning should be provided of any failure possibilities of such a machine ahead of time so that oil production is not adversely affected. It should be noted that the forewarning can be related to any type of machine or device. Target event, bases of hypotheses, identifying influences and historical event analysis and hypotheses formation for this example will now be described.

Target Event: For this example, a target even can be the failure of an underground rig equipment, e.g., electrical submersible pump (ESP). As a qualitative event, FGS 900 can focus on parameters that can describe the state, health or the performance of the ESP. For one embodiment, domain experts determine types of conditions that can impact the degradation of the ESP or machine and form hypotheses outcomes for forewarning generation.

Bases of Hypotheses: In this example, failure of underground equipment such an ESP can occur for many reasons, such as, for example:
1. Uneven stress on shaft: cause for mechanical failure: symptom—vibration;
2. Corrosion damages: cause for mechanical failure: symptom: vibration;
3. Fines migration: cause for mechanical failure: symptom: drop in pressure draw-down;
4. Overheating of the electrical cables: cause for electrical failure; or
5. High Gas-Oil Ratio (GOR) causing low throughput: cause for inefficiency.

For one embodiment, the above hypotheses outcomes language and expressions can be framed by a domain expert by way of user interface 957 to FGS 900. These hypotheses expressions describing outcomes can be stored in event, hypotheses and relevance database 919.

Identify Influencers: For one embodiment, sensors data 938 from data platform 930 can be configured into core and ring parameters or variables and data sets. Examples can include:
1. Uneven stress on shaft: monitor strain parameters and rate of change of strain;
2. Corrosion Damages: monitor vibration parameter and rate of change of vibration;
3. Fines Migration: measure gravel content and size (Lab analysis), pressure differential & rate change;
4. Overheating of the electrical cables: monitor temperature of the windings and rate of change; or
5. Gas-Oil ratio (GOR) is high causing inefficiency: measure GOR of formation fluid and rate of change.

In this example of protecting a ESP, core data and variables relate to pump health such as vibration, intake and motor temperature, intake and discharge pressure, and ring data and variables can be sand content, gas/oil ratio (GOR), corrosive elements content amount and well characteristics e.g., depth will be grouped under ring data 907.

Historical Event Analysis and Formation of Hypotheses: For this example, the system may have had 10 failures in the past. FGS 900 would ingest core data 905 and ring data 907 of the past 10 failures as a time series and identify any abnormal patterns that have led to the historical failures. Once patterns are isolated, FGS 900 can identify thresholds for each parameter or variable that indicates early signs of abnormalities, which can create conditions for hypotheses outcomes. Examples include:
Rate of pressure differential is more than X value when temperature is above Y value; or
GOR<t value and vibration<v Hz and so on.

These hypotheses outcomes along with condition rules can be configured or updated by rules engine 916 in the intuition platform 915 of FGS 900. FGS 900 can generate trend templates in determining normal operations and failure operations. Once FGS 900 is trained, hypotheses outcomes are created, relevance scores calculated, and initial hypotheses can be refined from ingestion of historical core and ring data to provide real time system forewarning.

Wireline Formation Sample Contamination Forewarning Example

For this example, a forewarning can be generated for wireline formation testing (WFT), which can provide advantages and savings for the oil industry. WFT is critical for operational contingencies of the well before it goes into oil production. However, the formation fluid samples collected for testing can often be contaminated with oil-based or water-based mud that is used for drilling. That is, mud filtrate invasion is unavoidable in WFT sample collection. FGS 900 can provide techniques in generating real time forewarning of contamination level of the oil sample and guide the engineers of the oil rig with advanced notice of lead time to collect decontaminated fluid, which can save probe operations and cost and improve operations.

Target Event: For this example, contamination level of formation fluid can be contributed by methane content, GOR and fluid color. These parameters can indicate the state of the system and act as core data. Such quantified data can be obtained from optical analyzers such as continuous gas analyzer (CGA) and live fluid analyzers (LFA). In this example, ring data can provide measures such as pumping speed, inlet pressure, anisotropy and etc. These measures can be either sample collections controlling conditions (probe) or reservoir conditions that affect the rate of fluid decontamination.

Hypotheses Formation: For this example, because parameters mentioned above are quantitative, the hypotheses outcomes and expressions can be in simplistic form such as:
GOR<x value;
METH_LFA and METH_CGA<y value; or
FLUID_COLOR<index,
Any number or different types of hypotheses expression can be used and evaluated to correlate the future decontamination from observing current set of variables, which is gain more reaction time if a certain condition is determined.

Historical Event Analysis: For this example, historical WFT operations data can be ingested as core and ring data or variables and correlated with hypotheses outcomes. For one embodiment, FGS 900 are trained using core and ring data and templates generated to determine conditions in providing real time system forewarning. WFT forewarning can be the same as the above example in which forewarning can implement the same processes at the presentation layer 950 to forewarn any number of users.

Testing: For this example, specific data from oil industries can be used to determine WFT data and for training and testing FGS 900.

NUMERICAL EXAMPLE

Another example with numbers is detailed below. Take, for example, a simple form of the WFT contamination forewarning use case detailed above. The target event can be the contamination level of the sample fluid and a system goal is to find ahead of time when the per-unit contamination level will go down to <0.7—which can be the threshold for accepting the sample. In this example, max contamination level can be ingested in a time series is indicated by 1. Take fluid color index (FCOL) and methane optical density METH_OD as the only two variables that indicate the contamination level of the WFT sample. FCOL can be derived by the LFA and methane optical density can be determined by CGA. In this example, the target event can be measurable using only two types of core data to find the lead time to the event when FCOL<0.7 and METH_OD<0.2.

Keeping the example simple, only pump out fluid rate (POFR) affects the time to reach decontaminated state for the fluid, yet if the POFR is too high, it creates vacuum which increases the gas to oil ratio (GOR). And, in this example, there are 10 historical probe operation data that are available for ingestion and training by FGS 900. Each past operation can create a time series and the length of the probe operations can vary from 4 hours to 20 hours, which provides a different number of data samples.

For one embodiment, before historical event/data analysis, the final event timestamp is tagged to the final event timestamp. The time stamp can be called when a good, decontaminated sample was collected, which was later confirmed by, e.g., lab analysis, as T=0 and then FGS 900 can ingest a fixed length back window, e.g., 1 hour for each time series to isolate abnormal patterns from core and data. In this example, if a 1 hour back window is chosen, FGS 900 can scan from T=−3600 seconds to T=0. However, for one embodiment, before lead time generator 911 performs lead time training algorithm, each time series data can be properly prepared by normalizing and expressing in percentiles so that observed patterns can be compared.

Referring to FIG. 14, a Numerical Example Table 1400 is shown for this example having time series 1401, core data isolated patterns 1402 and ring data isolated patterns 1403. In Table 1400, TS1 times series has core data isolated patterns for T=−50, FCOL rate change>10%, T=−765 METH_OD<10% and ring data isolated patterns for T=−562, GOR>0.25. TS2 time series has core data isolated patterns for T=−1022, FCOL acceleration>10% and ring data isolated patterns for T=−1324, POFR rate increased>5% and so on for additional time series. For one embodiment, a relevance score is calculated for each of the isolated time stamps and isolated patterns for the 10 time series can be stored on database 920. For one embodiment, domain experts can create or modify hypotheses outcomes which can estimate forewarning conditions based on the observations and domain knowledge. Examples of hypotheses for this example can be expressed as:
1. Rate of GOR increase>10% and METH_OD rate>5%→System State trajectory shifts. Calculate Lead Time using Trend algorithm and correct the trend path to observed event time. Store the trend template for this condition.
2. POFR rate change>5% and FCOL rate change>10%→System State trajectory shifts. Calculate Lead Time using Trend algorithm and correct the trend path to observed event time. Store the trend template for this condition.

For one embodiment, a user or domain expert can fine-tune such hypotheses outcomes with new conditions that have been trained by FGS 900. Once trained, FGS 900 can ingest core and real data related to the updated conditions to provide appropriate system forewarnings. This example shows a time window of 1 hour, but a time window of a longer time period to provide a more adequate lead time.

FIGS. 15A-15C provides another numerical example showing a Historical Data Analysis Table 1500, Isolated Patterns Table 1510, and Hypotheses Table 1520. Referring to FIG. 15A, Table 1500 shows a historical analysis of core variables C1 and C2, ring variables R1 and associated patterns for C1 and C2. The values for the C1 and C2 and R1 variables refer to normalized and percentile values. In the patterns section, the values for C1, C2 and R1 refer to rate of changes in percent form. In this example, a forewarning is generated for conditions of C1>0.4 and C2>0.7 wherein 0.4 and 0.7 refer to rate of change (percent). Highlighted values for C1, C2 and R1 are shown to show rate of changes of values of interest. In the Isolated Patterns Table 1510 of FIG. 15B, exemplary values for C1, C2 and R1 are given along with rate changes and acceleration. If values stay constant, rate and acceleration changes to not move significantly and those patterns can be ignored. However, values where rate and acceleration change significantly can be isolated in determining proper hypotheses outcomes. FIG. 15C shows Hypotheses Table 1520 shows hypotheses expressions H1, H2 and H3 for changing rates for C1, C2 and R1. Lead time for a forewarning can be generated using corresponding trend templates and isolated stamp data, core and ring data, hypotheses and trend details can be stored in database 920 for use by FGS 900.

In some embodiments, the intuition platform uses an intuition model that is a dynamic model that can ingest new variables and can rebuild the model internally. These new variables, referred to herein as the "unknown unknowns", are variables that subject matter experts (e.g., scientists) may not know are having an impact on the system behavior typically due to the time delayed nature of their influence. The intuition platform includes gap logic that can provide a hint where it sees a gap in situations in which the hypotheses outcome do not agree with the actual observations (when such observations are available), thereby highlighting an area where more analysis is needed. In this way, the gap logic provides a direction to the subject matter experts as to one or more new variables that may need to be added to one or more hypotheses to complete the model further. In this way, the gap logic helps form a new hypothesis where the hypotheses outcome do not agree with the actual observations when such observations are available.

In some embodiments, the gap logic may perform auto-hypothesis generation to generate one or more new hypotheses. Auto-hypothesis generation is a method that highlights the gap between hypotheses outcome and actual observations and then suggests modifications to the hypotheses in a more automated fashion. In some embodiments, auto-hypotheses generation builds context from qualified and repeatable changes in hypotheses' outcome under different situations and correlates it with the "experienced outcome" from past datasets to infer an upcoming future state. In some embodiments, these inferences lead to suggested modifications to hypotheses. In some embodiments, modifications to hypotheses are made in terms of weight and bias or logic of the hypotheses evaluation formula. In some embodiments, this is done using an error minimization approach to reduce the error between the hypotheses outcome and the observed results. By using the auto-hypotheses generation approach, the intuition platform can suggest to the subject matter experts changes in the evaluation formula and/or rules in order to reduce, and potentially minimize, the errors between the hypotheses outcome and the actual observations, providing the experts some guidance in terms of which direction they should focus.

Some embodiments of the hypothesis generation process are described in greater detail. Note though that in some embodiments, hypothesis generation focuses on rare events. For example, if the datasets are asymmetric, such that if it is an operation where operators are trying to control the stimuli, the outliers are measured. In some embodiments, the outliers are measured to determine a measure of statistical dispersion, which is the spread of the data. This may be performed using an interquartile range (via a IQR method) such as the following:

Outliers$<Q1-1.5*IQR$ or $>Q3+1.5*IQR$.

However, rare events are not necessarily outliers, so in some embodiments, the range is as follows:

Outliers$<Q1-IQR$ or $>Q3+IQR$.

In some embodiments, the hypothesis generation converts rare event signatures into "digits" referred to above as pattern bits using a pattern bit algorithm. In some embodiments, the pattern bits are created for all core and ring datasets. In some embodiments, these pattern bits are multi-dimensional coordinates describing features of the patterns of situational conditions (e.g., three dimensional coordinates (e.g., X, Y, Z) describing the shape, spread and rate of change of the patterns). In some embodiments, the hypothesis generation also calculates the rate of pattern changes at every predefined (e.g., significant) change occurrence in the situational conditions.

After the pattern bits are created, for every unique situation, the pattern bits are correlated with the ring and core data. This correlation may be with situational condition coordinates. In some embodiments, this correlation is both instantly as well as using time-distance cause and effect methods. A gap may be identified by the system between the cause and effect. This gap is usually associated with one or more events that have been taken into consideration as having an influence (or their influence had been considered less than their actual influence) on the hypotheses outcomes. In some embodiments, these events are rare events.

After correlation and the identification of any gaps, the intuition platform builds intuition templates. In some embodiments, the intuition templates are built by storing results of the correlation. The creation of the intuition templates may occur during historical data analysis. During historical data analysis, a goal of intuition framework is to create the intuition templates as well as work with the subject matter experts to create hypotheses that the experts form as they try to explain the abnormalities and develop reasons for the occurrence of the rare events (e.g., one or more features associated with rare events). These hypotheses are linked with the observed pattern bits and long-term trends for each given situational condition. In some embodiments, the intuition platform converts these hypotheses into a mathematical and/or expressions with functions that represents the features of the use case supporting each hypothesis. In other words, the hypothesis are translated into an expression with operators (e.g., higher, lower, derivative changes, etc.) that can be validated when new data is received. In some embodiments, this is performed using semantic algebra. These hypothesis are stored for the use case.

After situations with and without abnormalities are mapped in the intuition templates, the intuition platform is considered configured and ready to ingest and evaluate new data with respect to the hypothesis that have been generated. In some embodiments, every ingested dataset after that time (real time or historical) are run through the hypotheses evaluation. In some embodiments, the intuition platform computes a score for each hypothesis. As discussed above, in some embodiments, the scoring of hypotheses outcomes is referred to as relevance scoring and the scores are computed. In some embodiments, the scores computed by the intuition platform include a scale, a degree and a range.

In some embodiments, wherever the relevance scoring indicates deviation from the fulfillment of the hypotheses expectations (e.g., a hypothesis is not met or accurate), the intuition platform maps a gap of knowledge of experts and the scientific fabric that drives the system behavior under the situation. For example, in some embodiments, thresholds are used when evaluating the scores to determine if a hypothesis is correct based on a score's relationship with a threshold (e.g., a score exceeds a predefined threshold). Thus, the relevance scoring indicates whether a hypothesis is correct and if not (e.g., a hypothesis is not holding up), then the intuition platform is assumed to have a gap in its knowledge. These are the areas called unknown "unknowns", representing a current boundary of system's knowledge when modeling these situations.

When a gap occurs, in some embodiments, the system is augmented with information from subject matter experts. These experts may add, or map, another variable or feature to the hypothesis that is expected to influence the outcome so that the hypothesis will hold true when presented with new data, thereby creating a modified hypothesis. This variable or feature is the unknown and is added in an attempt to bridge the gap toward the set of rules governing some system. In some embodiments, auto-hypotheses generation automates at least a portion of the derivation of the quantified change in hypotheses by highlighting one or more variables that may be added to the model to bridge the gap affect the hypothesis outcome. In some embodiments, the hypothesis outcome may be changed from multiple different aspects (e.g., scale, degree and range) and these highlighted variables may be used by the subject matter experts to modify one or more hypotheses. At this point, subject matter experts give their modified hypotheses, add/or new variables to model the system behavior better that can include the rare events.

Thus, in some embodiments, auto-hypothesis generation is a process that helps to complete a flexibly built, dynamic scientific model (e.g., a non-data driven model) towards completeness. Once done, the model will rebuild and narrow the gap of abnormality between the hypotheses outcome and the actual observations. In some embodiments, this process of hypothesis modification continues through a number of iterations until the model is well mapped by the variables and their behaviors under different situations.

In the foregoing specification, the invention has been described with reference to specific exemplary embodiments thereof. It will, however, be evident that various modifications and changes may be made thereto without departing from the broader spirit and scope of disclosed embodiments. The specification and drawings are, accordingly, to be regarded in an illustrative rather than a restrictive sense.

What is claimed is:

1. An artificial intelligence-based forewarning method comprising:
    collecting and storing core data, ring data, and surroundings data using a sensor that performs sensor readings at a first sensor measurement speed and encoding the core data and ring data with time stamps, wherein the core data includes parameters describing a system and the ring data includes parameters describing surroundings of the system;
    analyzing the collected core data and ring data, including some in the form of time series data;
    changing the first sensor measurement speed to a second sensor measurement speed, the change being caused by the encoded time stamps having a correspondence to one or more determined changing situations of the system, and providing a relevance score for hypothesis outcomes based on each determined changing situation of the system, wherein the relevance score indicates a correlation between said each determined changing situation of the system and each of the hypothesis outcomes, the relevance score of at least one determined changing situation of the system correlated with an observed impact on the system that appears uncorrelated due to a time gap between a cause and an effect of the observed impact, as a result of processing the core data and ring data as the time series data, and wherein analyzing the collected core data and ring data comprises creating conditions for the hypothesis outcomes by:
        filtering the core data and ring data as a time series to eliminate non-useful data;
        identifying, based on analyzing the core data and ring data, one or more trends that led to abnormal behavior of the system, the abnormal behavior of the system corresponding to an error by the sensor that performs the sensor readings and a mechanical failure of the system; and
        identifying thresholds for each influencer parameter that is indicative of the abnormal behavior of the system, the thresholds being included in the conditions;
    correlating each determined situation with one or more of the hypothesis outcomes representing a future system state based on the relevance score and iteratively reducing error from bias;
    modifying one or more hypotheses, based on performing auto-hypothesis generation, to reduce the time gap between the hypothesis outcomes and actual observations when the hypothesis outcomes do not agree with the actual observations, wherein the auto-hypothesis generation automates a portion of a derivation of a quantified change in the hypothesis outcomes from multiple different aspects comprising scale, degree, and range; and
    generating a system forewarning based on the correlated hypothesis outcomes using the relevance scores, the generated system forewarning gaining forewarning time for the system to react to an event.

2. The method of claim 1, wherein modifying the one or more hypotheses comprises at least one of updating or revising the one or more hypotheses based on changing the core data or ring data.

3. The method of claim 1, wherein the relevance score includes determining a ratio of a quantified measure of changes in a hypothesis outcome of the one or more hypothesis outcomes to one or more changing situations of the system based on the core data and ring data, and further wherein generating a system forewarning includes calculating a lead time before a future system state outcome occurs for at least one of the correlated hypothesis outcomes or outputting the system forewarning with the at least one calculated lead time.

4. A computing system comprising:
    a plurality of storage devices to store core data, ring data, and surroundings data of a system, wherein the core data includes parameters describing a system and the ring data includes parameters describing surroundings of the system; and
    one or more processors coupled to the storage devices and configured to implement:
    an artificial intelligence-based platform configured to:
        collect and analyze the core data and ring data, including some in the form of time series data, using a sensor that performs sensor readings at a first sensor measurement speed and the core data and ring data being encoded with time stamps,
        change the first sensor measurement speed to a second sensor measurement speed, the change being caused by the encoded time stamps having a correspondence to one or more determined changing situations of the system, and provide a relevance score for hypothesis outcomes based on each determined changing situation of the system,
        correlate each determined situation with one or more hypothesis outcomes representing a future system state based on the relevance score, wherein the relevance score indicates a correlation between said each determined changing situation of the system and each of the hypothesis outcomes, the relevance score of at least one determined changing situation of the system correlated with an observed impact on the system that appears uncorrelated due to a time gap between a cause and an effect of the observed impact, as a result of processing the core data and ring data as the time series data, and wherein the artificial intelligence-based platform is operable to create conditions for the hypothesis outcomes by: filtering the core data and ring data as a time series to eliminate non-useful data; identifying, based on analyzing the core data and ring data, one or more trends that led to abnormal behavior of the system, the abnormal behavior of the system corresponding to an error by the sensor that performs the sensor readings and a mechanical failure of the system; and identifying thresholds for each influencer parameter that is indicative of the abnormal behavior of the system, the thresholds being included in the conditions, and further wherein the artificial intelligence-based platform is operable to modify one or more hypotheses, based on performing auto-hypothesis generation, to reduce the time gap between the hypothesis outcomes and actual observations when the hypothesis outcomes do not agree with the actual observations, wherein the auto-hypothesis generation automates a portion of a derivation of a quantified change in the hypothesis outcomes from multiple different aspects comprising scale, degree, and range; and a wisdom engine to generate a system forewarning based on the correlated hypothesis outcomes using the relevance scores and iteratively reducing error from bias, the generated system forewarning gaining forewarning time for the system to react to an event.

5. The computing system of claim 4, wherein the artificial intelligence-based platform is configured to determine a ratio of a quantified measure of changes in a hypothesis outcome of the one or more hypothesis outcomes to one or more changing situations of the system based on the core data and ring data in providing the relevance score, and further wherein the wisdom engine is configured to calculate a lead time before a future system state outcome occurs for at least one of the correlated hypothesis outcomes or outputting the system forewarning with the at least one calculated lead time.

6. The computing system of claim 4, wherein the wisdom engine is configured to provide the system forewarning via at least one of a mobile device, a computing device, or a computing system connected to a cloud system.

7. The computing system of claim 4 further comprising:
a user interface configured to receive an input to at least one of update or revise the hypothesis outcomes.

8. The computing system of claim 4, wherein the artificial intelligence-based platform is configured to perform a historical data analysis of the analyzed core data and ring data.

9. A non-transitory computer-readable medium comprising instructions, which if executed by a computing system, causes the computing system to perform an operation comprising:
collecting and storing core data, ring data, and surroundings data using a sensor that performs sensor readings at a first sensor measurement speed and encoding the core data and ring data with time stamps, wherein the core data includes parameters describing a system and the ring data includes parameters describing surroundings of the system;
analyzing the collected core data and ring data, including some in the form of time series data;
changing the first sensor measurement speed to a second sensor measurement speed, the change being caused by the encoded time stamps having a correspondence to one or more determined changing situations of the system, and providing a relevance score for hypothesis outcomes based on each determined changing situation of the system, wherein the relevance score includes determining a ratio of a quantified measure of changes in the hypothesis outcomes to the one or more changing situations of the system based on the core data and ring data, wherein the relevance score indicates a correlation between said each determined changing situation of the system and each of the hypothesis outcomes, the relevance score of at least one determined changing situation of the system correlated with an observed impact on the system that appears uncorrelated due to a time gap between a cause and an effect of the observed impact, as a result of processing the core data and ring data as the time series data and correlating each determined situation with one or more hypothesis outcomes representing a future system state based on the relevance score, and wherein analyzing the collected core data and ring data comprises creating conditions for the hypothesis outcomes by:
filtering the core data and ring data as a time series to eliminate non-useful data;
identifying, based on analyzing the core data and ring data, one or more trends that led to abnormal behavior of the system, the abnormal behavior of the system corresponding to an error by the sensor that performs the sensor readings and a mechanical failure of the system; and
identifying thresholds for each influencer parameter that is indicative of the abnormal behavior of the system, the thresholds being included in the conditions;
modifying one or more hypotheses, based on performing auto-hypothesis generation, to reduce the time gap between the hypothesis outcomes and actual observations when the hypothesis outcomes do not agree with the actual observations, wherein the auto-hypothesis generation automates a portion of a derivation of a quantified change in the hypothesis outcomes from multiple different aspects comprising scale, degree, and range; and
generating a system forewarning based on the correlated hypothesis outcomes using the relevance scores and iteratively reducing error from bias, the generated system forewarning gaining forewarning time for the system to react to an event.

10. The non-transitory computer-readable medium of claim 9 wherein the relevance score includes determining a ratio of a quantified measure of changes in a hypothesis outcome of the hypothesis outcomes to one or more changing situations of the system based on the core data and ring data, and further comprising calculating a lead time before a future system state outcome occurs for at least one of the correlated hypothesis outcomes or outputting the system forewarning with the at least one calculated lead time.

11. The non-transitory computer-readable medium of claim 9, wherein the computing system is to further perform an operation comprising:
at least one of updating or revising the hypothesis outcomes based on changing the core data or ring data.

* * * * *